(12) United States Patent
Saund et al.

(10) Patent No.: US 8,464,167 B2
(45) Date of Patent: Jun. 11, 2013

(54) SYSTEM AND METHOD FOR SYNCHRONIZED AUTHORING AND ACCESS OF CHAT AND GRAPHICS

(75) Inventors: Eric Saund, San Carlos, CA (US);
Jamie G. Ruiz, Kitchener, CA (US);
James V. Mahoney, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 571 days.

(21) Appl. No.: 12/325,421

(22) Filed: Dec. 1, 2008

(65) Prior Publication Data
US 2010/0138756 A1 Jun. 3, 2010

(51) Int. Cl.
*G06F 3/00* (2006.01)

(52) U.S. Cl.
USPC .......................................... 715/758

(58) Field of Classification Search
USPC .......................................... 715/758
See application file for complete search history.

(56) References Cited

U.S. PATENT DOCUMENTS

| | | | |
|---|---|---|---|
| 6,766,374 B2 | 7/2004 | Trovato et al. | |
| 7,036,077 B2* | 4/2006 | Saund et al. | 715/273 |
| 7,171,473 B1 | 1/2007 | Eftis et al. | |
| 7,181,492 B2 | 2/2007 | Wen et al. | |
| 7,353,254 B2* | 4/2008 | Kusuda | 709/204 |
| 7,383,310 B1 | 6/2008 | Lyle et al. | |
| 7,412,048 B2 | 8/2008 | Gao et al. | |
| 7,426,536 B1 | 9/2008 | Noda et al. | |
| 7,426,540 B1 | 9/2008 | Matsumoto et al. | |
| 7,861,176 B2* | 12/2010 | Weisberg | 715/758 |
| 2004/0220791 A1* | 11/2004 | Lamkin et al. | 703/11 |
| 2006/0090137 A1* | 4/2006 | Cheng et al. | 715/758 |
| 2007/0116195 A1 | 5/2007 | Thompson et al. | |
| 2007/0168511 A1 | 7/2007 | Brochu et al. | |
| 2007/0239827 A1 | 10/2007 | Deboy et al. | |
| 2007/0300169 A1 | 12/2007 | Jones et al. | |
| 2008/0005240 A1* | 1/2008 | Knighton et al. | 709/204 |
| 2008/0034037 A1 | 2/2008 | Ciudad et al. | |
| 2008/0148970 A1* | 6/2008 | Chen et al. | 101/212 |
| 2008/0214214 A1* | 9/2008 | Reissmueller et al. | 455/466 |

(Continued)

OTHER PUBLICATIONS

Saund et al., "Stylus Input and Editing Without Prior Selection of Mode", Association for Computing Machinery, Proc. 16th Annual ACM Symposium on User Interface Software and Technology, Vancouver, Canada, Nov. 2-5, 2003, pp. 213, 216.

(Continued)

*Primary Examiner* — Omar Abdul-Ali
*Assistant Examiner* — Anil Bhargava
(74) *Attorney, Agent, or Firm* — Fay Sharpe LLP

(57) ABSTRACT

A system and method for communication in an online electronic chat environment having multiple communication devices connected to each other in a communication network is provided. Displayed on a display screen of an electronic communication device of the multiple communication devices, is a chat region configured to hold text, and a graphics region to hold graphic objects. The chat region and the graphics region are positioned on a common electronic canvas of the display screen. Text from the chat region can be moved to the graphics region, and graphic objects in the graphics region may be moved to the chat region. The design allows for the mixing of chat and graphics in a common window when material is moved between the two modalities. In additional embodiments, the text in the chat region and the graphics in the graphics region are synchronized whereby movement of one causes action in the other.

21 Claims, 23 Drawing Sheets

U.S. PATENT DOCUMENTS

2008/0228894 A1*  9/2008  Chen et al. ............... 709/207
2008/0231635 A1   9/2008  Saund
2008/0232690 A1   9/2008  Saund et al.
2008/0235211 A1   9/2008  Saund
2009/0094560 A1*  4/2009  Grossman et al. ........... 715/863

OTHER PUBLICATIONS

EP Search Report, App. No. 09176837.4-2416/2192732, Dated May 11, 2010, Completed May 3, 2010, Munich, Germany.

"Fraunhofer IPSI-Concert-ConcertChat"; Fraunhofer Institute; http://www.ipsi.fraunhofer.de/concert/index_en.shtml?projects/chat; 3 pgs.; Jan. 8, 2006.

"Fyew: Product Features—FREE Anytime Collaboration and Live Conferencing"; http, vyew.com/site/product/; 4 pgs.; Nov. 25, 2005.

"Groupboard: Online Java Whiteboard and Chat Software"; http//www.groupboard.com/products/; 7 pgs.; Apr. 27, 2002.

"iScribble.net—Portal", iScribble.net Interactive Drawing and Chatting; http://www.iscribble.net/login.html; 10 pgs. Nov. 8, 2006.

Saund et al., "Perceptually-Supported Image Editing of Text and Graphics"; Proceedings of the 16$^{th}$ Annual ACM Symposium on User Interface Software and Technology (UIST 03); Nov. 2-5, 2003; Vancouver; BC, Canada. NY: ACM; 2003; 183-192.

* cited by examiner

SYSTEM AND METHOD FOR SYNCHRONIZED AUTHORING AND ACCESS OF CHAT AND GRAPHICS

INCORPORATION BY REFERENCE

The disclosures of the following U.S. patents/applications are fully incorporated herein by reference: U.S. Pat. No. 7,036,077 to Saund et al., entitled "Method For Gestural Interpretation In A System For Selecting And Arranging Visible Material In Document Images", issued Apr. 25, 2006; U.S. Patent Application Publication No. 2008/0232690 to Saund et al., entitled "Method And Apparatus For Creating And Editing No-Link Diagrams in Pen Computing Systems", published Sep. 25, 2008; U.S. Pat. No. 7,353,254 to Kusuda, entitled "Collaborative Chat System", issued Apr. 1, 2008; U.S. Patent Application Publication No. 2007/0116195, to Thompson et al., entitled "User Interface For Integrating Diverse Methods Of Communication", published May 24, 2007; U.S. Patent Application Publication No. 2007/0239827 to Deboy et al., entitled "Global Chat System", published Oct. 11, 2007; U.S. Patent Application Publication No. 2007/0300169 to Jones et al., entitled "Method and System For Flagging Content In A Chat Session And Providing Enhancements In A Transcript Window", published Dec. 27, 2007; and U.S. Publication No. 2008/0034037 to Ciudad et al., entitled "Sharing Graphic User Interface Output In Chat Environment", published Feb. 7, 2008.

BACKGROUND

The present application is directed to online electronic communication, and more particularly to implementations of electronic messaging in the form of chat sessions.

Online electronic messaging software has been developed which permits the setting up of chat rooms on chat-web servers, where client work stations are connected to chat-web servers via communication channels. During a chat session between two or more users, each user is able to send and receive text-based messages in realtime. However, it is considered that limiting communication between users to text-based messages limits the ability of chat room users to communicate as fully as possible. Others have noted this limitation, and have proposed concepts attempting to expand the communication experience in chat room environments.

For example, U.S. Pat. No. 7,353,254 to Kusuda, entitled "Collaborative Chat System", issued Apr. 1, 2008, discloses chat windows which are displayed directly over a web page of a browser window. Particularly, a chat window displaying section displays the chat windows at positions pointing to elements or items in a web page. U.S. Patent Application Publication No. 2007/0116195, to Thompson et al., entitled "User Interface For Integrating Diverse Methods Of Communication", published May 24, 2007, discloses a concept of an integrated communication interface for composing and sending messages. The interface is configurable to switch between different communication methods, e.g., electronic mail, instant messaging, SMS, chat, voice. U.S. Patent Application Publication No. 2007/0239827 to Deboy et al., entitled "Global Chat System", published Oct. 11, 2007, describes a system which allows users to send and receive messages among themselves while viewing a website. U.S. Patent Application Publication No. 2007/0300169 to Jones et al., entitled "Method and System For Flagging Content In A Chat Session And Providing Enhancements In A Transcript Window", published Dec. 27, 2007, describes a system which allows a user to set visible flags at the starting point of lines in a transcript region of the live chat window. The visual flags are displayed in a transcript region, visually indicating the lines that are associated therewith, and the live chat window is further modified to enable the user to navigate to the flags. U.S. Publication No. 2008/0034037 to Ciudad et al., entitled "Sharing Graphic User Interface Output In Chat Environment", published Feb. 7, 2008, describes a GUI or application output which can be shared in a chat environment, where the user can choose to share content or request that content be shared by another user, where the shared content can be integrated in content that is transmitted as part of the chat session.

Other applications have discussed the concept of including a shared drawing window and a chat window, such as the product Vyew of Simulat, Inc. from Berkeley, Calif., which states it is a web conferencing tool with asynchronous collaboration capabilities.

GroupBoard is an online Java whiteboard and chat software, operated by Group Technologies of Drumheller, Alberta, Canada. GroupBoard in one embodiment is a set of multi-user Java applets, including whiteboard, chat, message board, games, invoice conferencing which can be placed on a web page. Also from Group Technologies is GroupBoardWorld.net, which is an advanced web meeting/conferencing software, allowing the user to set up web conferencing rooms with whiteboard, voice/video conferencing and desktop sharing.

iScribble is an online drawing site where people geographically distant can work on a drawing at the same time. An interactive canvas allows users to draw pictures using a mouse or graphic tablet. Another system and process is known as ConcertChat, provided by Fraunhofer-Ipsi of Darmstadt, Germany. This is a text-based communication which provides the sharing of material. The ConcertChat technology promotes itself as allowing all chat users to have a shared view of arbitrary documents, web pages and screen shots, and a shared whiteboard support for joint sketching. All contributions are said to be archived, which allows asynchronous discussion, searching in the discourse, and post-processing of meetings.

Thus, while online chat systems are ubiquitous, there are many improvements which can be made to provide a more robust and full communication between users.

BRIEF DESCRIPTION

A system and method for communication in an online electronic chat environment having multiple communication devices connected to each other in a communication network is provided. Displayed on a display screen of an electronic communication device of the multiple communication devices is a chat region configured to hold text and, a graphics region to hold graphic objects. The chat region and the graphics region are positioned on a common electronic canvas of the display screen. Text from the chat region can be moved to the graphics region, and graphic objects in the graphics region may be moved to the chat region. The design allows for the mixing of chat and graphics in a common window when material is moved between the two modalities. In additional embodiments, the text in the chat region and the graphics in the graphics region are synchronized whereby movement of one causes action in the other.

DETAILED DESCRIPTION

Figure 1:
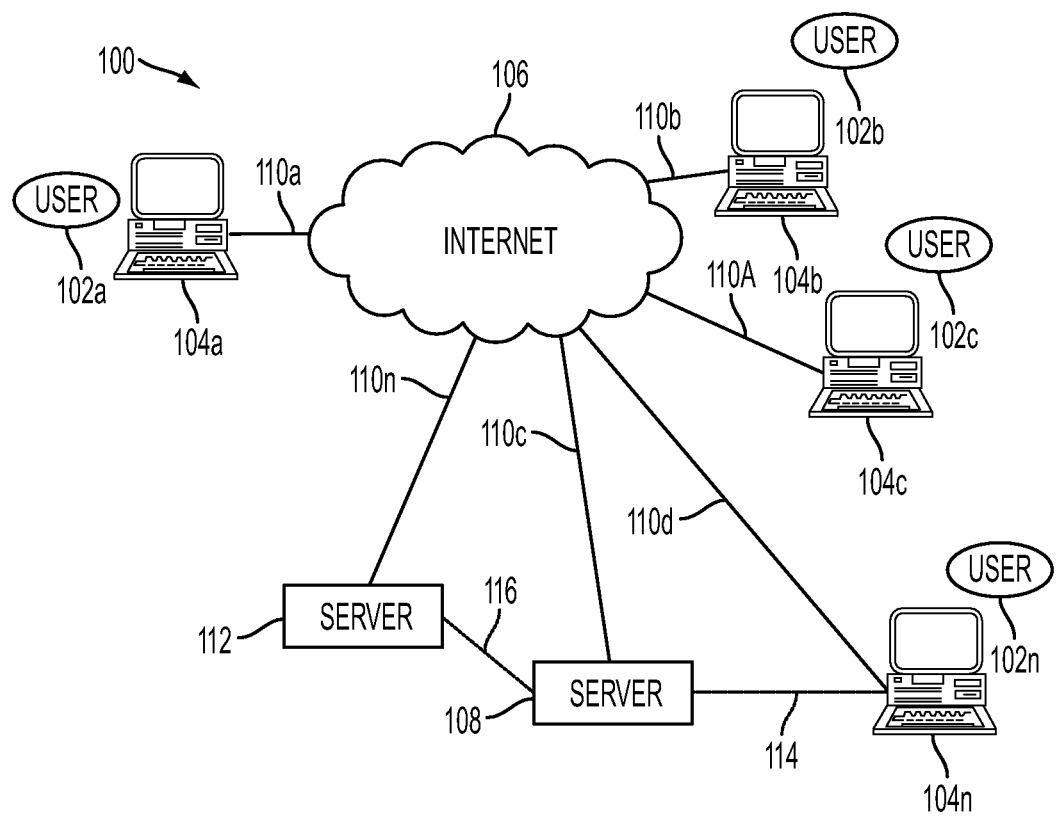
FIG. 1 illustrates a network configuration to which the concepts of the present application are incorporated.

FIG. 1 illustrates an electronic network environment 100 in which the concepts related to online electronic chat of the present application may be incorporated. In chat environment 100, two or more chat participants or users 102a-102n operate communication devices (or clients) 104a-104n. The communication devices are shown as computers such as laptop or desktop computers. However, it is understood the concepts of the present application are not limited to these devices, and the communication devices may also be personal communication devices such as personal data assistants (PDAs), cell phones, electronic tablets or any other communication device having capabilities which are able to employ the concepts of the present application.

Users 102a-102n communicate over communication devices 104a-104n via Internet 106 to a server 108, wherein server 108 operates to control online chat communication. In order to chat, users 102a-102n post and receive messages 110a-110n to server 108 via Internet 106 or other servers 112. That is, users 102a-102n send messages via communication devices 104a-104n and Internet 106 to server 108, which in turn delivers messages to other users 102a-102n who are in the chat room. In this manner users 102a-102n communicate with each other in substantially realtime. As also shown in FIG. 1, while server 108 may be connected to user terminals 104a-104n via Internet 106, communication devices (e.g., 104n) may be connected directly to the servers, e.g., 108, such as by connection line 114. Furthermore, a server (e.g., server 108) may be directly connected to other servers 112, such as shown by connection line 116. Therefore, other than the users' communication devices 104a-104n being connected to server 108 through Internet 106, connections among and between the servers (e.g., 108, 112) may be via Internet 106 or via any other convenient configuration.

The above system is understood to only be an example of one network in which chat sessions may take place, and in which concepts of the present application may be employed. Particularly, it is to be understood the chat network could be arranged in other arrangements and employ other components, as long as those arrangements and components are operating the following to-be-described systems and processes.

A particular concept of the present application is providing online communication which offers the features and affordances of text chat, and on a common electronic canvas that permits sharing of other multi-media among chat users. The multi-media being provided includes the ability to draw and edit with freeform digital ink, structured graphics, static images, audio clips, video clips, drawn animation, and synthetic animation, among other content (in the following discussion, the terms "graphic", "graphics" "graphic object" and "graphic objects" are often used and are intended to encompass the broad concept on multi-media and the content encompassed therein).

These concepts are disclosed herein with a user interface design and supporting technology that mixes text and other multi-media content in the same electronic canvas. Text is entered in one region (e.g., chat region) of the electronic canvas, while graphics may be created, edited, or otherwise provided in another region (e.g., graphics region) of the same electronic canvas, for example in an interactive whiteboard. The system and process described herein is designed such that there is no distinction between a chat mode of operation and a graphics mode of operation. Eliminating this distinction provides a seamless experience for users to either chat or draw and/or edit at will, without explicit mode switching.

A movable timeline (via scrolling) is provided to allow review of the history or a replay of the chat, by simultaneous scrolling of the text and erasure (backward direction), and redrawing (forward direction) of the graphics. Text and graphics can be copied and/or moved between the text and graphics regions. When a graphic is placed in the text region, it will scroll with the text through time, while text remains stationary in the graphics region where it is placed and may be animated through time (e.g., through the erasure and redrawing operations). Thus, the present system, sometimes called herein by the name Graffiti Chat, is a hybrid chat/shared whiteboard configuration.

Some types of graphic creation and editing which may be employed in the present systems have been described, for example, in U.S. Pat. No. 7,036,077, entitled "Method For Gestural Interpretation In A System For Selecting And Arranging Visible Material In Document Images"; and U.S. Patent Application Publication 2008/0232690, entitled "Method And Apparatus For Creating And Editing Node-Link Diagrams In Pen Computing Systems."

It is to be noted that in at least one embodiment, the concepts set forth herein may be a computer program product, comprising a computer-usable medium having a computer-readable program code embodied therein. The medium may be a memory location within one or more of the communication devices (104a-104n) and/or servers 108, 112 of FIG. 1, as well as other storage devices for these elements, including but not limited to memory sticks or disks. The computer-readable program code is adapted to implement a method for generating a chat region and a text region on a single display screen of the communication devices (104*a*-104*n*). It may also be considered that in at least certain embodiments, operation of computer-readable program codes turns the communication device into chat-texting and graphics-generating devices.

Figure 2:
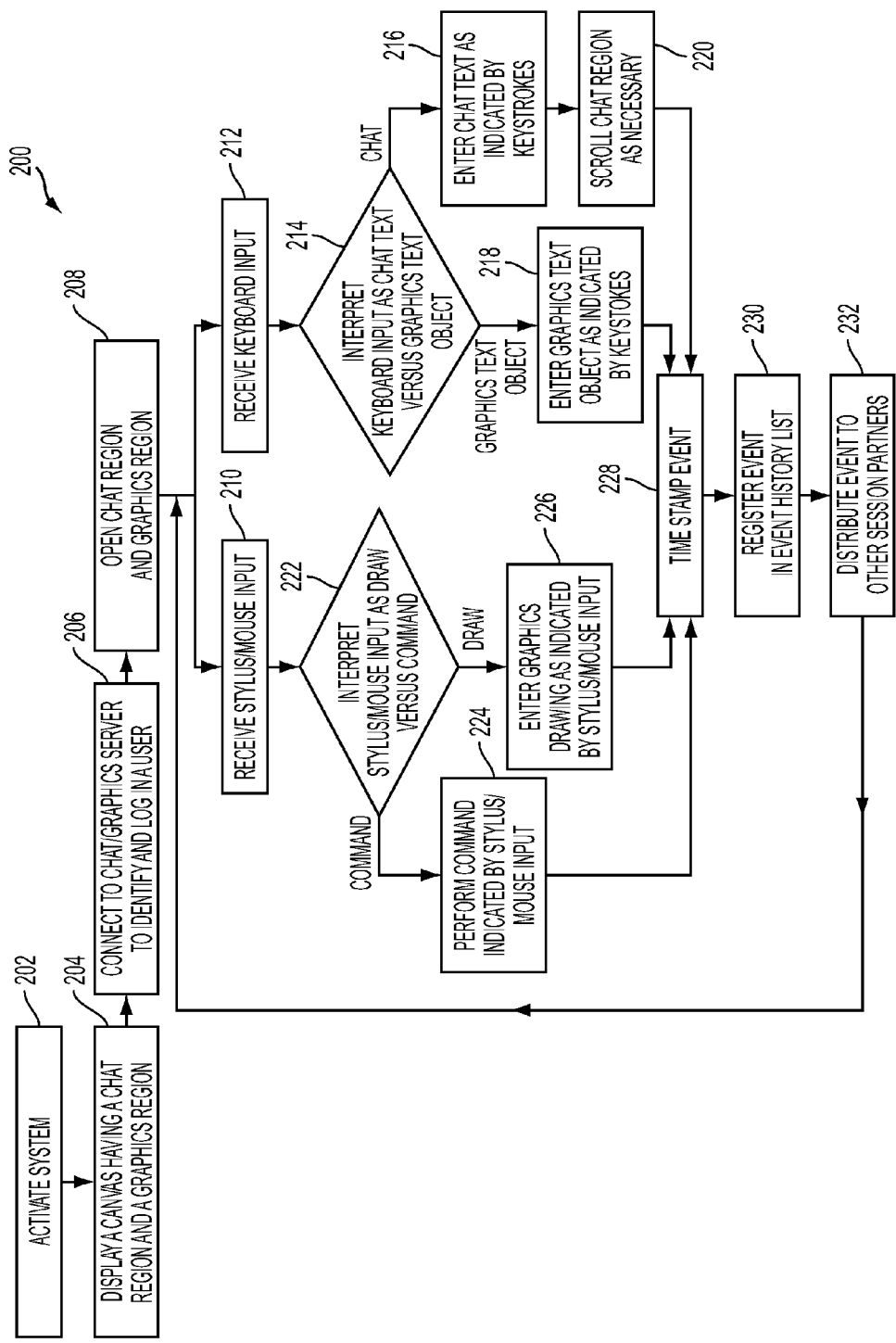
FIG. 2 illustrates a system and process of the present application.

Turning to FIG. 2, set forth is an overview of some operational aspects of the Graffiti Chat system and process, which may be implemented in a network such as shown in FIG. 1.

Flow diagram 200 of FIG. 2 activates the system (step 202). Thereafter, a canvas such as on a computer screen is displayed having a chat region and a graphics region (e.g., a whiteboard) (step 204). The system connects to a server such as a chat/graphics server where the user is identified (step 206). For example, once connected to the server, the user will log in using a password. If it is the user's first time logging in, the user signs up for an account, and may then immediately begin using the account. The server verifies the user's name and password and logs the user into the system. In operation, the computer program of the user (i.e., the client) sends the server the connection information of the computer which is being used (e.g., IP address and the number of the port assigned to the client). The server also provides the user with the names of everyone on their contacts list. Thereafter, the server creates a temporary file that has the connection information for that particular user and the list of contacts. Then a check is made to determine if any of the users in the contacts list are currently logged in. If the server determines a users' contact is logged in, it sends a message back to the client on the user's computer with the connection information for that particular contact. The server also sends the user's connection information to the names on the user's contacts list that are also signed in. Thereafter, when the client obtains the connection information for a name in their contact list, the status of that name is changed to "online" from "offline." The user may then click on the names in the contact list who are online, and a window opens displaying an electronic canvas having a chat region and a graphics region where the user can both enter chat text, and draw and edit graphics (step 208).

The user authors and enters textual chat through keyboard typing, and also performs drawing and editing of graphical and textual material through mouse or stylus commands, and through the use of the keyboard. Such entries are optionally controlled by actions of the user as indicated by receive stylus/mouse input operations (step 210) and receive keyboard input operations (step 212).

A user interface method interprets keyboard input as being one of chat text or graphics text objects (step 214). Based on the interpretations, chat entries are made as indicated by the keystrokes (step 216) or graphic text objects are entered as indicated by the keystrokes (step 218) (this process is described in detail below). When the keyboard entry is determined to be a chat entry, the chat region will be scrolled as necessary (step 220) to allow additional chat input.

Upon receipt of an input from a stylus/mouse in step 210, the system interprets the stylus/mouse input as either a draw operation or a command instruction issued from the user (step 222). If a command, the command is performed (step 224). On the other hand, if the input interpreted in step 222 is found to be a draw operation, the generated graphics are entered as a drawing graphics object (step 226).

Each text chat entry in the chat region of the canvas (216), and each operation on a graphics or text object in the graphics region in the canvas (step 218 and step 226) as well as each performed command (step 224) is registered as an event, and each such event is time-stamped with the time at which that event was conducted by the user who performed the event (step 228). Each time-stamped event is also registered on an event history list, in chronological order (step 230). Thereafter, the registered time-stamped events are distributed to others who are participating in the session (step 232).

As will be explained by examples in the following, the time stamps associated with chat and graphics events provide capabilities for synchronized review and playback of the chat and graphics regions of the canvas.

Figure 3:
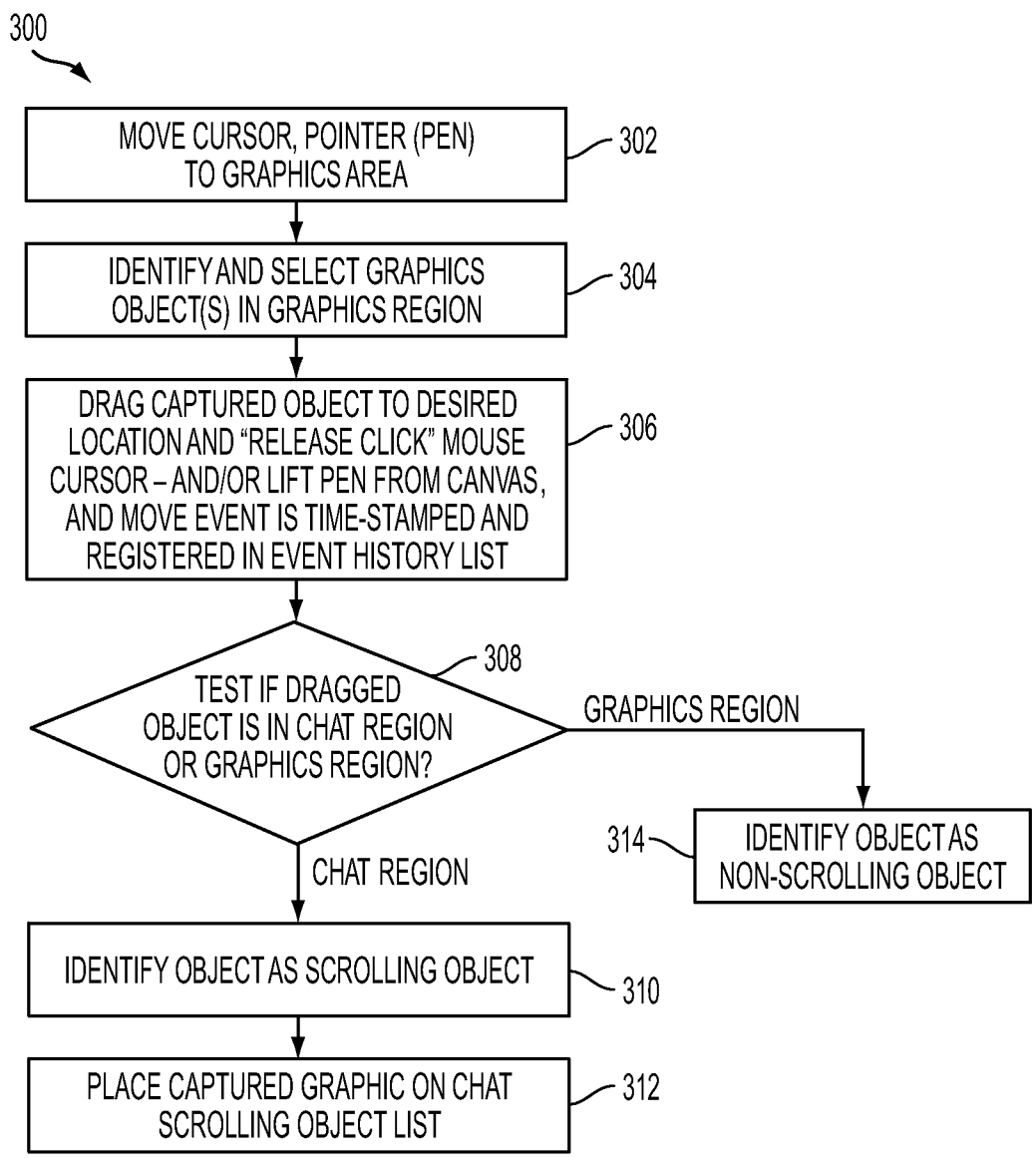
FIG. 3 illustrates a system and process for moving a graphic object into a chat region.

Turning now to FIG. 3, described is a system and process which includes the capability of providing not only the chat and graphics on a common canvas, but also for the interaction between data in these two regions. For example, process 300 of FIG. 3 allows for the attachment of graphical objects in the scrolling chat region. Using the mouse or stylus, the user moves to the graphics region (step 302) and identifies and selects an object(s) in graphics region (step 304). For example, the user may click the left mouse button on one or more objects, using the shift key to select a plurality of objects; tap a stylus on one or more objects; encircle one or more objects with a lasso using the mouse or stylus; and/or drag a selection rectangle enclosing one or more objects. Once selected, the user drags the selected object(s) to another location with the mouse or stylus. After the selected object(s) have been dragged to the desired location and the mouse button released or stylus lifted, the move event is time-stamped and registered on an event history list (step 306). Then, a test is undertaken to determine if the objects are in the chat or graphics region (step 308) of the canvas. If in the chat region, the object are identified as a scrolling objects (step 310) and placed on a list of scrolling objects (step 312). Note that through the editing capabilities provided by the graphical editing facilities, it is possible to duplicate objects in the graphics region prior to dragging them to the chat region. If not in chat region, the object is identified as a non-scrolling object (step 314).

Figure 4:
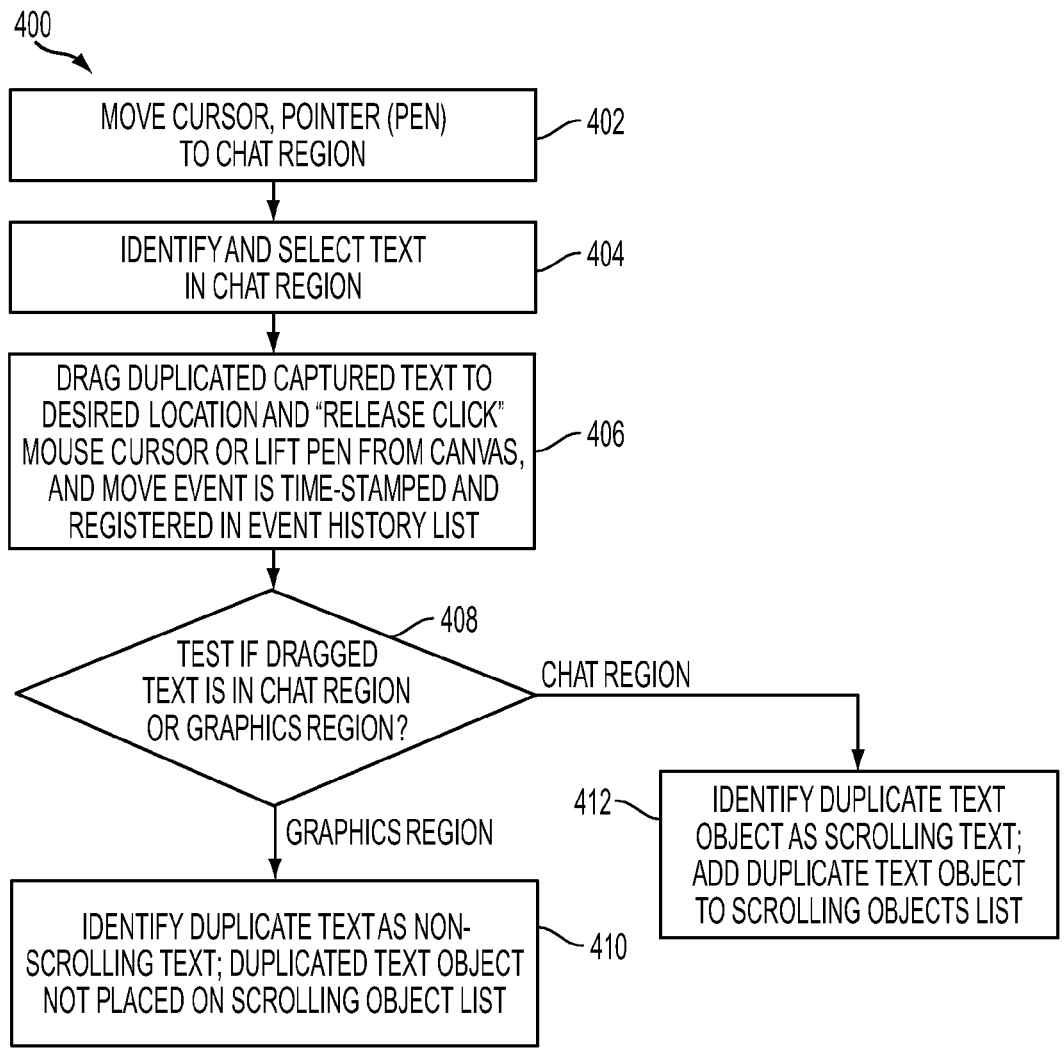
FIG. 4 illustrates a system and process for integrating text into a graphics region.

Similarly, and as shown in FIG. 4, it is possible to drag copies of chat textual entries into the graphics region of the canvas, as shown for example by process 400. Using object selection techniques similar to those used to select objects in the graphics region, the user moves to the chat region (step 402) and identifies and selects text items appearing in the chat region of the canvas (step 404). Once selected, the user may initiate a drag move by pressing the mouse over a portion of the selected text and dragging. When dragging chat text, the original text remains and a new duplicate copy is automatically created, to be placed by the drag operation. When the drag move is completed by releasing the mouse button or lifting the stylus, the duplicate event and move event are registered together on the event history list and time-stamped (step 406). A test is then performed to determine if the dragged text lies in the graphics region or the chat region (step 408). If the text is found to be in the graphics region, the duplicated text object is not placed on the scrolling objects list (step 410). If the duplicated text object is found to be in that region, then it is added to the scrolling objects list.

The benefits of such features will be explained in greater detail through examples provided in following sections of this description.

Figure 5:
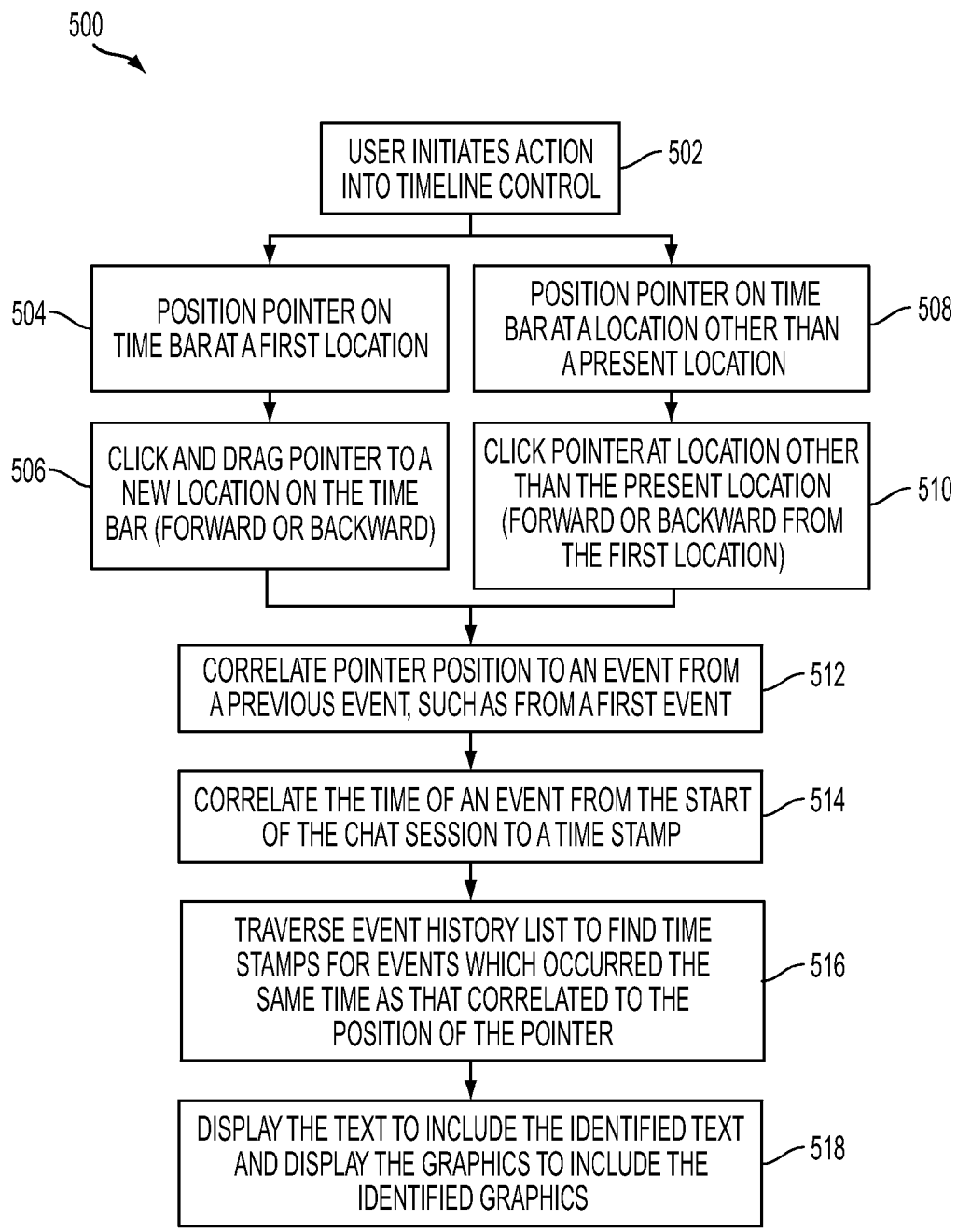
FIG. 5 illustrates a system and process for historical movement.

Turning to yet another feature of the present system, attention is directed to process 500 of FIG. 5. This process takes advantage of the time synchronization between events occurring in the chat region and the graphics region which occurs because all chat and graphics editing events are time-stamped and registered on the event history list.

In step 502, the process shows that user has initiated an action on the timeline control. The user may position a pointer or cursor on the timeline control handle of a time or scroll bar at a first location (step 504), and then click and drag the pointer to a new location in the scroll or time bar, i.e., move the control handle either up or down or in other means corresponding to forward or backward in time (step 506). Alternatively, a user may position the pointer in the time or scroll bar at a location other than the position of the control handle (step 508), and then click the pointer at that location, i.e., corresponding either to forward in time or backward in time from the location of the control handle (step 510). In either case, the present location on the time or scroll bar has been moved, corresponding to either forward or backward in time, from its existing location. Based on these operations, the system will correlate the new position to an event time from a previous event on the event history list, such as from a first event (step 512). In other words, if the original pointer position was five minutes into a chat session, the user can move the time pointer back to, for example, three minutes into the chat session. The system, upon this operation, will then correlate the time of an event from the start of the chat session to a time stamp (step 514). By this operation, the system will traverse the event history list looking for time stamps to events which occurred back to the three-minute mark, and then will identify text and graphics events having a time stamp the same as that correlated to the position of the pointer (step 516). Thereafter, the system displays the text to include the identified text, and displays the graphics to include the identified graphics (step 518).

In other words, since the text and graphics have been synchronized by virtue of their time stamps and placement on the event history list, if the timeline control moves to three minutes into the chat, then the system will identify the text chat and will move the scrolled discussion to that point in time so that it may be displayed. At the same time, due to the synchronization, changes will occur in the graphics region. For example, if the scrolling is occurring backwards in time, the image creation, deletion, and move events in the graphics section will be undone in accordance with the time stamps of the graphic objects.

When actual scrolling is occurring, a test is undertaken to determine what text has moved off the screen and the system and process will display only that text determined to still be on the screen. As an operation scrolls up and down, only certain parts of the chat queue or list will be visible on the chat side. Basically, as more text is added, the system will scroll up. Then when a person scrolls down, whatever is in the time period will be shown as selected by a scroll bar and will be visible, and everything not in that time frame will not be displayed. It is to be understood that if an object is selected and moved, for example, from the graphic side to the text chat region, it will no longer be in the graphics region. Also, when it is moved to the chat region, it is added to the scrolling list, it will be given a new time stamp as of the time of that move operation.

As previously mentioned in one embodiment of the present application, the graphics region may employ the concepts of an inferred mode protocol of the so-called InkScribe system, such as described in U.S. Pat. No. 7,036,077 to Saund et al. and the ConceptSketch system, such as described in U.S. Patent Application Publication No. 2008/0232690 to Saund et al. Another editing system which may be employed in the graphics region is known as ScanScribe and is a mouse/keyboard interface intended primarily for editing images of documents. ScanScribe offers Foreground/Background separation, overloaded loop selection, and flat lattice groups for tap-based selection. Groups can be formed in any of three ways: manually using a menu command; automatically when selected objects are acted on together, and automatically through a recognition-based grouping command invoked through an Edit menu.

Figure 6:
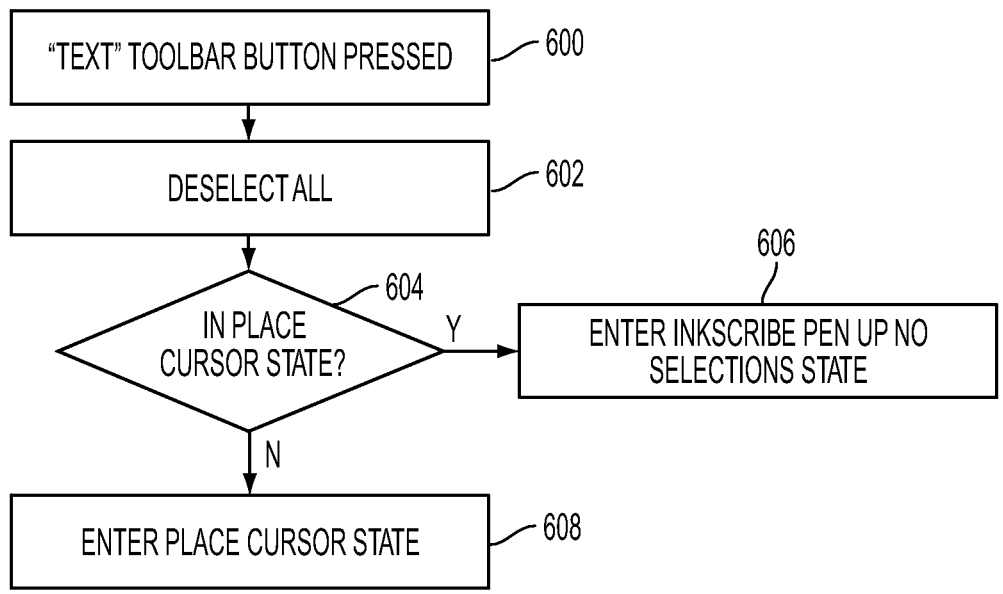
FIG. 6 illustrates a system and process for toggling between a writing state, and a place cursor state.
Figure 7:
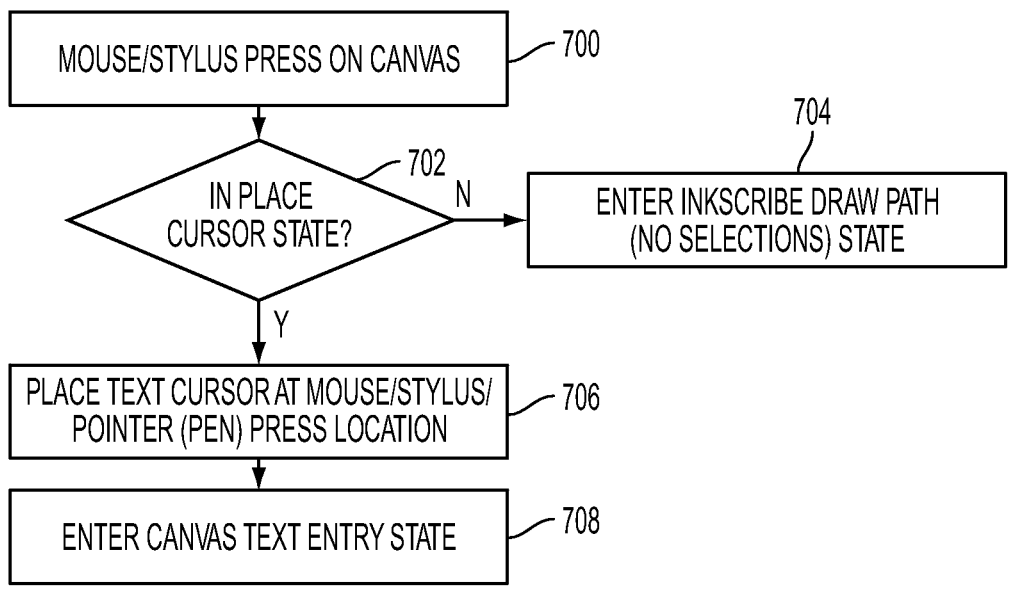
FIG. 7 illustrates a system and process for toggling between a drawing state, and a place cursor state from operation of a mouse or stylus press on a canvas of the present system and process.
Figure 8:
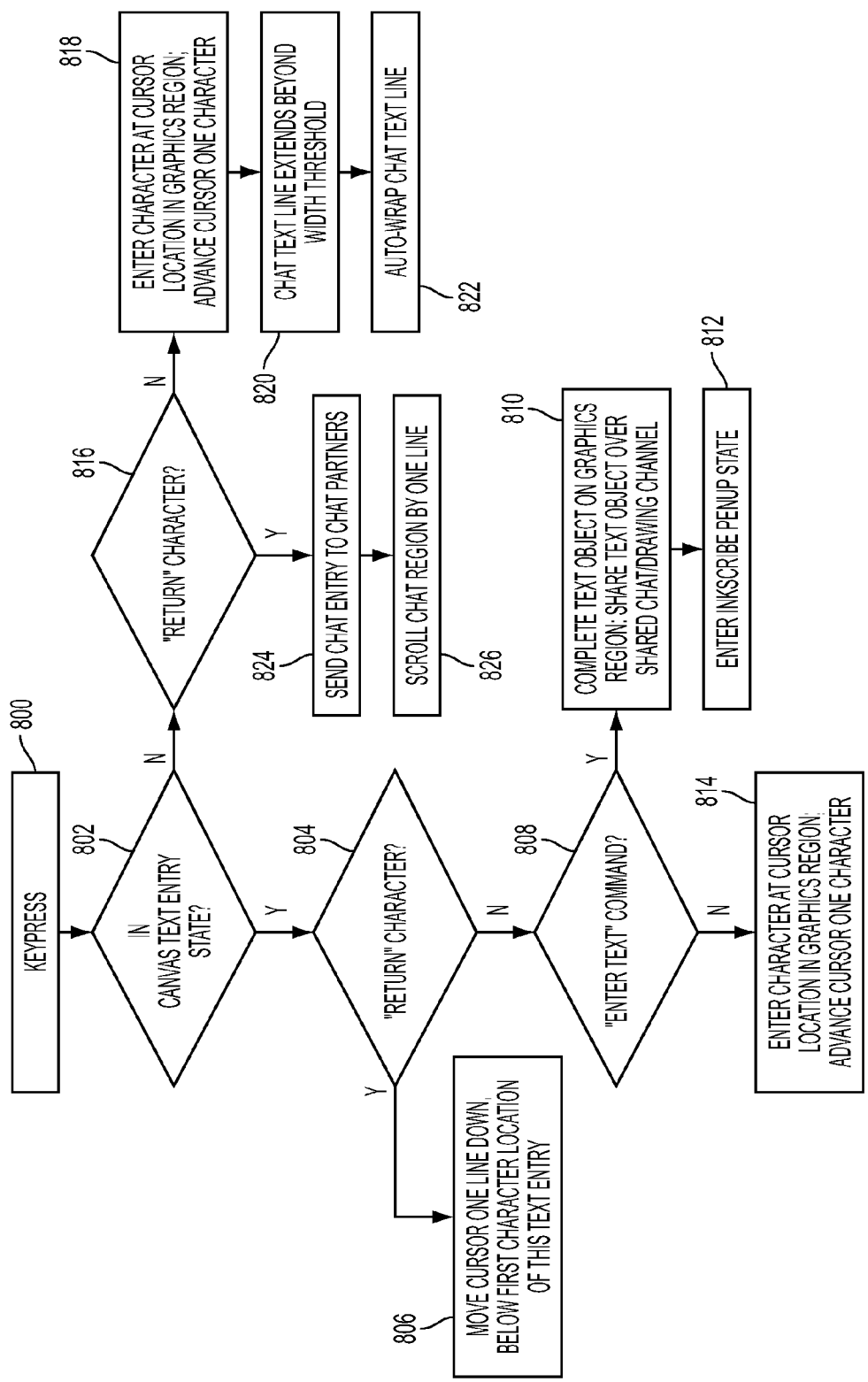
FIG. 8 illustrates different paths for operating the system and process of the present application, including entering characters in the chat region and the graphics region, starting from a key press.

Taking into account the above concepts, and turning now to FIGS. 6-8, illustrated is the logic flow of how to make the keyboard and/or pointer entry functions behave in the graphics and chat regions when for example the system may employ the InkScribe/ConceptSketch processes for graphic creation, display and manipulation.

Turning to FIG. 6, if the user wants to enter text in the graphics region, they will initially perform a special operation which is represented in FIG. 6 as pressing a tool bar button indicated as "Text" (step 600). Performing this operation causes a deselect of anything that might otherwise have been selected, such as graphics related operations (step 602). Next, the system detects whether the process is in a Place Cursor state (step 604). If it is in a Place Cursor state, the process enters the InkScribe/ConceptSketch Pen Up No Selection state (step 606). The Pen Up state is the standard inferred mode protocol of InkScribe/ConceptSketch, which means that it is normal pen operation, such as simply drawing in the text or graphics region. Alternatively, if not in the Place Cursor state of (step 604), the system can enter the state (step 608). Thus, step 604 is essentially a toggle which allows a user to enter a Place Cursor state for the placement of the cursor at a selected location on the canvas.

The Place Cursor state of FIG. 6, is used when a mouse or stylus press occurs on the canvas as shown in FIG. 7 (step 700). The system detects if it is in a Place Cursor state (step 702). If the system is not in a Place Cursor state (N), the system will enter an InkScribe/ConceptSketch Draw Path state (no selections state) (step 704). However, if the system determines the process is in such a state (Y), the cursor is placed at the position of the mouse or stylus (step 706). Then when the mouse or pen is pressed, the process moves to the Canvas Text Entry state (step 708). In the current InkScribe/ConceptSketch operations, this means whenever the user types on the keyboard, the system starts putting characters at that location.

The system response to a key press is shown in FIG. 8. When there is a key press (step 800), the process determines whether the system is in the Canvas Text Entry state (step 802). If the answer is yes (Y), then the process determines whether the entered character is a Return character (step 804). If it is a Return character (Y), the process moves the cursor one line down, below the first character location of this text entry (step 806). If at step 804, it is determined the character is not a Return character, the process moves to a next decision block to determine whether the entered text is an Enter Text command (step 808). The Enter Text command may for example be pressing of the "End" key or the "Insert" key. If it is an Enter Text command (Y), the process will complete the text object on the graphics region which includes and registering and time-stamping the event, so the text object may be shared over a shared chat/drawing channel (step 810). And once this is done, the system will go back to the Pen Up state of InkScribe/ConceptSketch (step 812). In this situation at step 810, the "Text Object" will go to a server, and the server will distribute it to other participants in the chat session. So this lower branch which has been discussed is a situation where the user is entering typed text objects in the graphics region.

As mentioned above, step 810 includes the concept of registering and time-stamping the noted event. It is to be similarly understood that along with this step and others shown in 800, all chat, text, graphics entry, and editing events occurring in embodiments of this application are time-stamped and placed on the Event History List in accordance with the discussion related to FIG. 2.

When at step 808, if the determination is that the entered text is not a command character (N), the character is entered at the cursor location in the graphics region, and the cursor is advanced one character (step 814). The process then loops back through to the top of the loop (step 800), until another keypress is received, and the process moves to step 802, as previously discussed.

Returning to step 802, when the system is not in the Canvas Text Entry state (N), in other words, the user is simply chatting or drawing or editing graphics, key presses are interpreted as the user is simply chatting by entering text in the chat region. In this state, a test is undertaken upon a key press to determine whether the character entered is a Return character (step 816). When the answer is no (N), the character is entered in the next position of the chat region (step 818). At Step 820 the system determines whether the current chat text line extends beyond a width threshold (step 820). If so, an auto-wrap chat text line feature is undertaken (step 822). In other words, a user is simply typing and if the text extends beyond the bounds of the chat region it automatically wraps to the next line.

However, at the Return character inquiry of step 816, if it is determined the character is a Return character (Y), this indicates the user is done with that chat entry. Then as part of step 824, the chat text (i.e., an event) is time-stamped and registered on the event history list. Then the events registered by the user are sent to the server and distributed to other users (step 824).

Every event by another user that is received from the server will have a time stamp. The event is registered in a user's local event history list, and the operation indicated by that event is performed. Chat events result in new chat text objects being entered into the chat region, accompanied by appropriate scrolling (step 826). The chat text objects are added to the scrolling object list. Graphics entry and editing events result in graphical or textual objects being added, moved, deleted, or otherwise modified. In this manner, all chat and graphics are synchronized among distributed users.

The starting point for FIGS. 6-8 is a common state in which the system is awaiting user input. Each of these Figures represents a different branching of processing logic depending on the user's action. For example, the process of FIG. 6 starts when the user clicks on a "Text" button possibly found on a toolbar of the system. The process in FIG. 7 is started when a mouse or stylus such as a pen stylus is pressed onto the canvas itself, either in the chat region or graphics region, and the process of FIG. 8 starts with the pressing of any key. It is again to be appreciated the operations described in FIGS. 6-8 exist within the teachings of FIG. 2. Thus, it is to be understood the concepts of FIG. 2 are incorporated into the operations of FIGS. 6-8.

Having described various concepts for the operation of the system according to the present application, it may be seen that Graffiti Chat is a hybrid chat/shared whiteboard application, and as has been taught, chat is entered in one scrolling region or chat region of the canvas, while graphics (digital ink, bitmap images, etc.) can be created and edited in a graphics region of the same canvas. A timeline allows review of history, or replay from the start of a session, by simultaneous scrolling of the text and erasure (backward direction) or redrawing (forward direction) of the graphics. Text and image material can be copied and/or moved between the text and graphics regions. Text and graphics in the chat region scroll together through time, while chat and graphics in the graphics region stay where placed and animate through time.

Figure 9A:
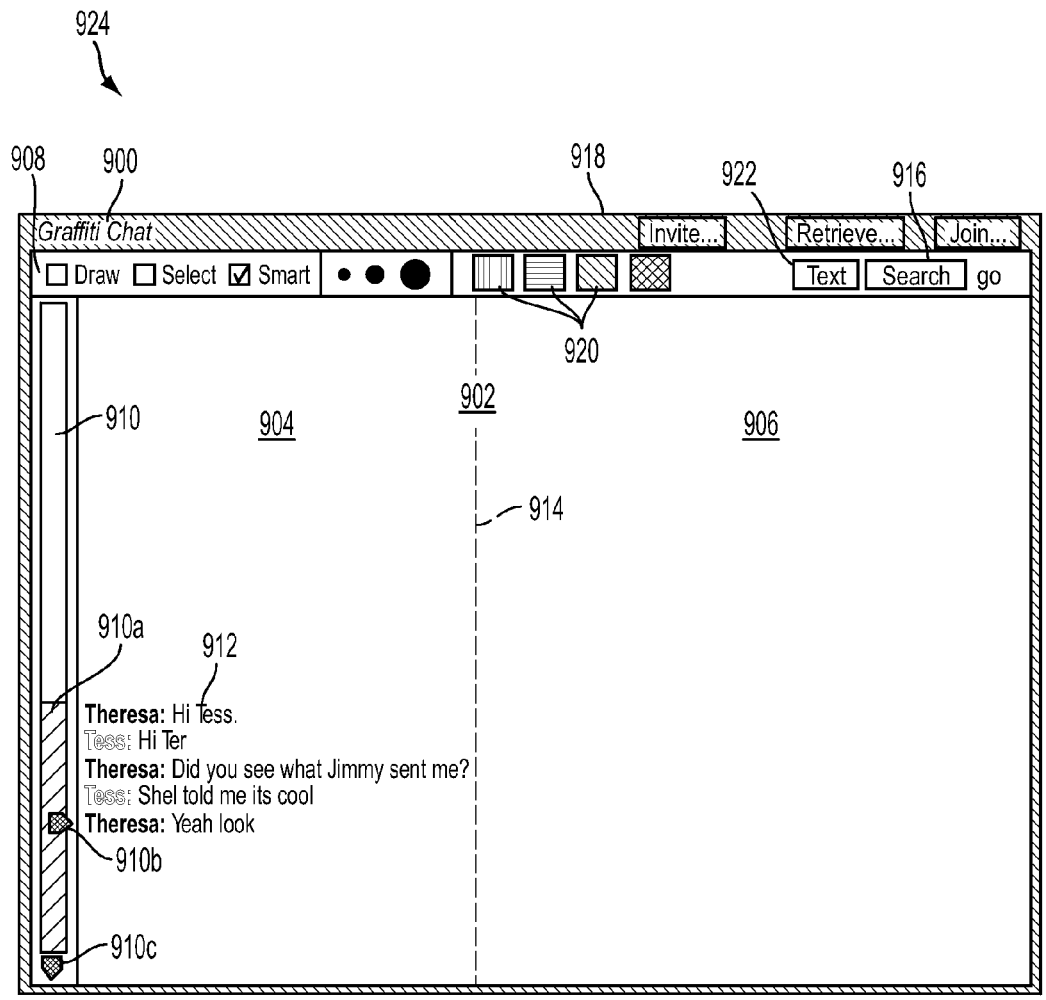
FIG. 9a-9i illustrates examples of likely screen shots of the present system and process in operation.

An exemplary series of screen shots for one possible design of a user interface 900 for Graffiti Chat, along with exemplary actions being displayed on the user interface 900, is shown in the sequence of FIGS. 9A-9I. Turning to FIG. 9A, an existing state of the user interface 900 shows an electronic canvas 902 having a chat region 904 on the left side of the canvas, which includes a column of lines of text that have been entered by participants in a Graffiti Chat session. On the right side of electronic canvas 902 is a graphics region 906. While the current state of the graphics region 906 of the electronic canvas 902 is empty, this graphics region 906 is designed to contain a variety of graphical multi-media including, but not limited to, freeform digital ink, structured graphics, static images, animated images, audio clips, video clips, drawn animation and synthetic animation, among other content.

As participants enter textual chat, the chat column automatically scrolls upward as their text is added to the chat column.

As previously mentioned, in some embodiments, graphics and text creation and/or editing operations may exploit an Inferred Mode protocol of the InkScribe/ConceptSketch drawing editor, or it may employ some other explicitly moded drawing/editing user interface method. The buttons toolbar 908 labeled "Draw", "Select", and "Smart" provide a user with access to both the inferred-mode and explicitly-moded user interface protocols in the same implementation. For example, when "Smart" is checked user interface 900 employs the Inferred Mode protocol of InkScribe/ConceptSketch, and when "Smart" is not checked, an explicitly-moded drawing protocol would be active.

Scroll bar 910 defines a region in which is located a timeline control handle 910*a*, wherein movement of control handle 910*a*, within scroll bar 910 controls the display of session history. As the user scrolls, the column of chat text rolls downward to reveal past chat items (typically text but also including voice and/or video clips) and graphic objects residing in the chat region, and the graphical creation and editing operations are undone in backward sequence. Moving control handle 910*a* displays the events which occurred in a session backward and/or forward at will. This is possible because chat and graphic events are all stored on the event history list.

The "Now" locator icon 910*b* identifies the position in the time history of the chat and graphics that will be currently displayed. Chat items displayed below the "Now" locator are de-saturated in color to indicate this chat text is in future time with respect to the moment currently being pointed to.

The "Play" button 910*c* automatically advances the timeline forward to recreate the sequence of text and graphic editing actions. This is especially useful when the chat items are not typed text but voice or video snippets. This facility allows a new participant to catch up on the current state, to read the text of chat that has already occurred and to view the time course of the creation of the current state of the graphical portion of the canvas. For example, they might replay the chat interchange and graphical editing associated with two friends collaboratively drawing a cartoon and discussing what characters to include and what to write in their thought bubbles.

As has been described, a graphic object may be attached to the chat text by moving the identified object to the chat region 904 so the object scrolls along with the column of text (e.g., chat column) 912. For example, in response to one person's endearing remark, their chat partner may hand-draw a heart positioned in the chat column 912 that thereby scrolls along with the other text. A graphics scrolling boundary 914 is a faint indicator of the portion of the canvas where graphic material will scroll with the chat column. While shown in these figures as a dashed line, it is to be understood this is only an example of a boundary indicator. Other embodiments may have boundary 914 as a faint solid line, or color or other visual indicators may identify the boundary between chat region 904 and graphics region 906.

In addition, and as previously described, text may be brought into graphics region 906 of the canvas by selecting text from the chat region, and dragging a duplicate copy of the selected text to graphics region 906. When located in the graphics region, the selected duplicate copy of text behaves just like any other graphic object. This provides a way for users to bring out to the stationary graphic region just selected portions of their chat dialog. For example, if the chat consisted of a debate about the merits of Nokia phones versus iPhones, participants could easily pull out arguments that summarize key points in a stable record. This would be on the same canvas as the participants could drop pictures of these phones, and draw pointers to various buttons or visual aspects of the phones' designs. Participants can also alter the text when it is in the graphics region, e.g., they can highlight or bold portions, as well as add or delete characters in the duplicate text. Scrolling of the chat enables a temporally organized dialog of the session.

Operation of the time scroll bar permits browsing through the time history of a chat/graphics session. The present system and process of Graffiti Chat also permits content-based search through time of chat and graphics by use of a search widget, where search terms are entered into a search box 916.

Chat search is similar to the search techniques used in web browsers to find pages and/or keywords. Text to be searched for is sought either in the chat column, on the graphics section of the canvas, or typically, both.

For each found item in chat search, the time history is positioned so that that searched-for item appears at the Now locator 910b. Because of temporal history synchronization of chat scrolling with graphics, the graphic display appears as it did when that searched-for text item was typed by the user.

Search is also possible in the graphics domain. A user can select text or a graphic object, and request search for times when this material was previously edited or authored. Because of temporal history synchronization of chat scrolling with graphics, the chat column is positioned to its state when that searched-for graphical item(s) was(were) drawn, pasted, or modified.

Thus, Graffiti Chat introduces a new multimedia genre and democratized authoring tool for producing content in it.

User interface 900 also includes a social networking toolbar 918, which includes various buttons, including but not limited to "Invite", "Retrieve" and "Join" buttons that provide a user with the ability to invite a user to join a chat, retrieve a user's name from a contacts list and to allow a user to join a chat room. Graphics editing controls toolbar 920 includes editing buttons which permit editing in the graphics region 906, including color, resizing, highlighting, rotating, deleting buttons, as well as other editing features. Also shown is a "Text" button 922, which allows a user to enter a Text Entry state in the graphics region, as described previously. Particularly, entering this mode allows the user to enter text on the graphics portion of the canvas. It is to be appreciated the elements of the user interface 900 are displayed at a display screen 924 of a communication device such as the communication devices of FIG. 1.

Having discussed various components of user interface 900, the following paragraphs walk through FIGS. 9A-9I, discussing the above features as they apply to a use scenario.

FIG. 9A: Theresa initiates a session and invites her friend Tess through the "Invite" facility of the social networking toolbar 918. Their session begins as pure chat. By default, text typed at the keyboard is automatically entered in the chat column (see 912). The exception to this is if the user enters a Text Entry state (see 922) and then enters text on the graphics portion of the canvas. Text will auto-wrap after it extends some distance into the canvas in the graphics region 906. Identities of chat participants can be indicated by font color or some other visually salient feature.

Figure 9B:
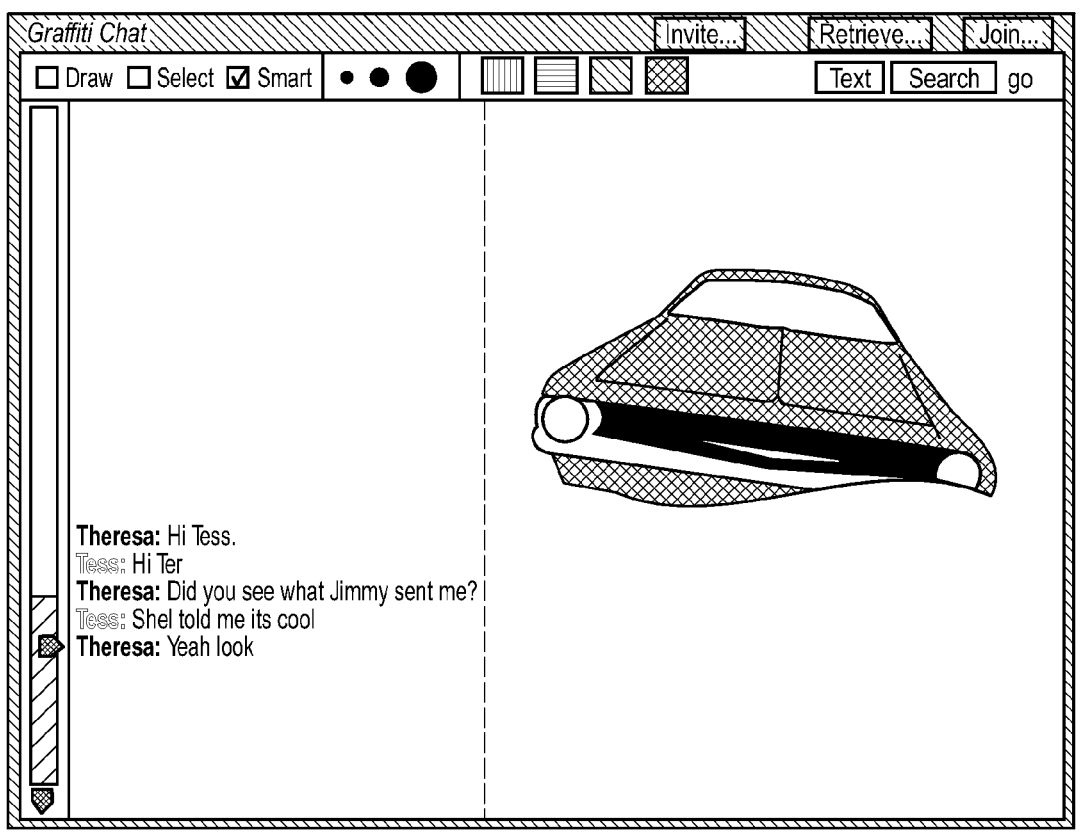

FIG. 9B: Theresa has invited Tess to the session to discuss a picture their friend Jimmy has sent her. Theresa drops this into the graphics side of the canvas (906) using the image editing features (920) of the Graffiti Chat application. While not shown in this version of the user interface design, graphics actions may be indicated by a placeholder item in the chat column. By this design, timeline control would be obtained over reply and undo of sequences of graphics operations un-separated by chat events.

Figure 9C:
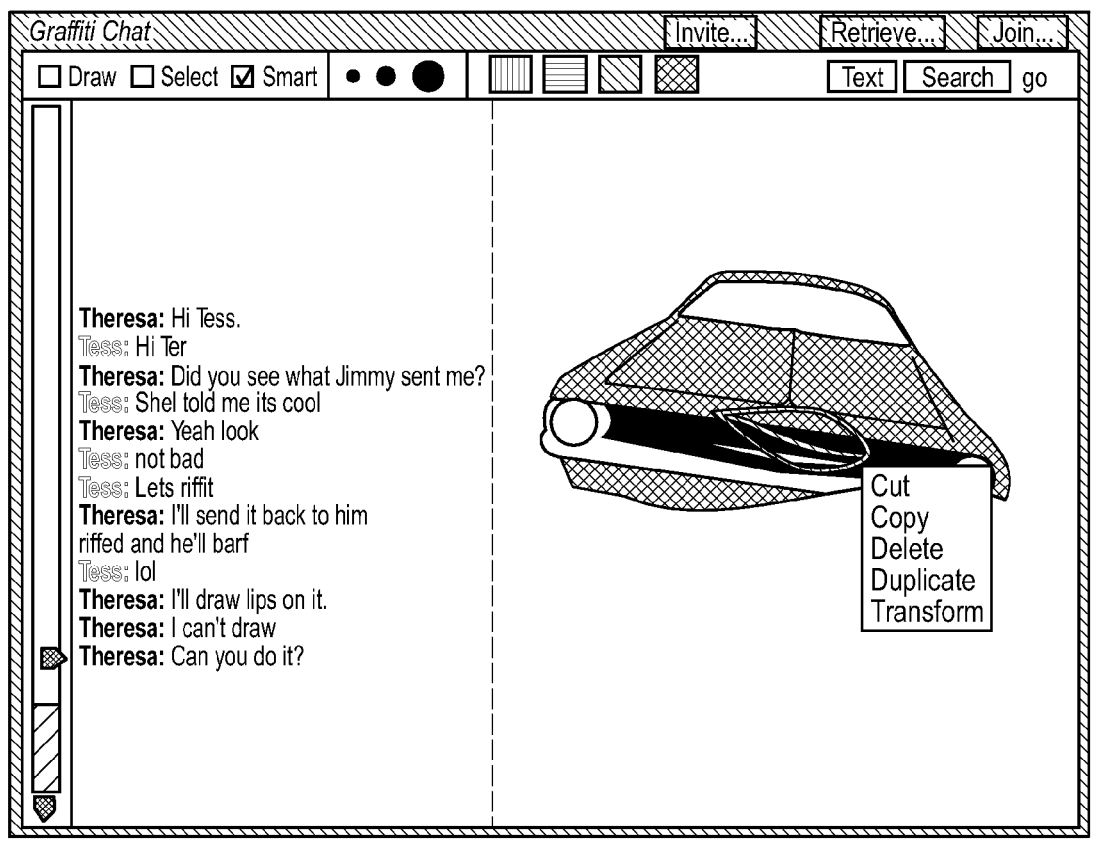

FIG. 9C: Theresa and Tess chat while Theresa uses the digital ink (graffiti) feature of the application to draw lips over Jimmy's car image. The Inferred Mode interface ("Smart" is checked) interprets mouse drag actions in the canvas as possible digital ink. The protocol interprets mouse click actions as object selection gestures. In this figure the lips are shown as selected because they have a halo, and a pop-up menu offers possible edit actions on the selected objects.

Figure 9D:
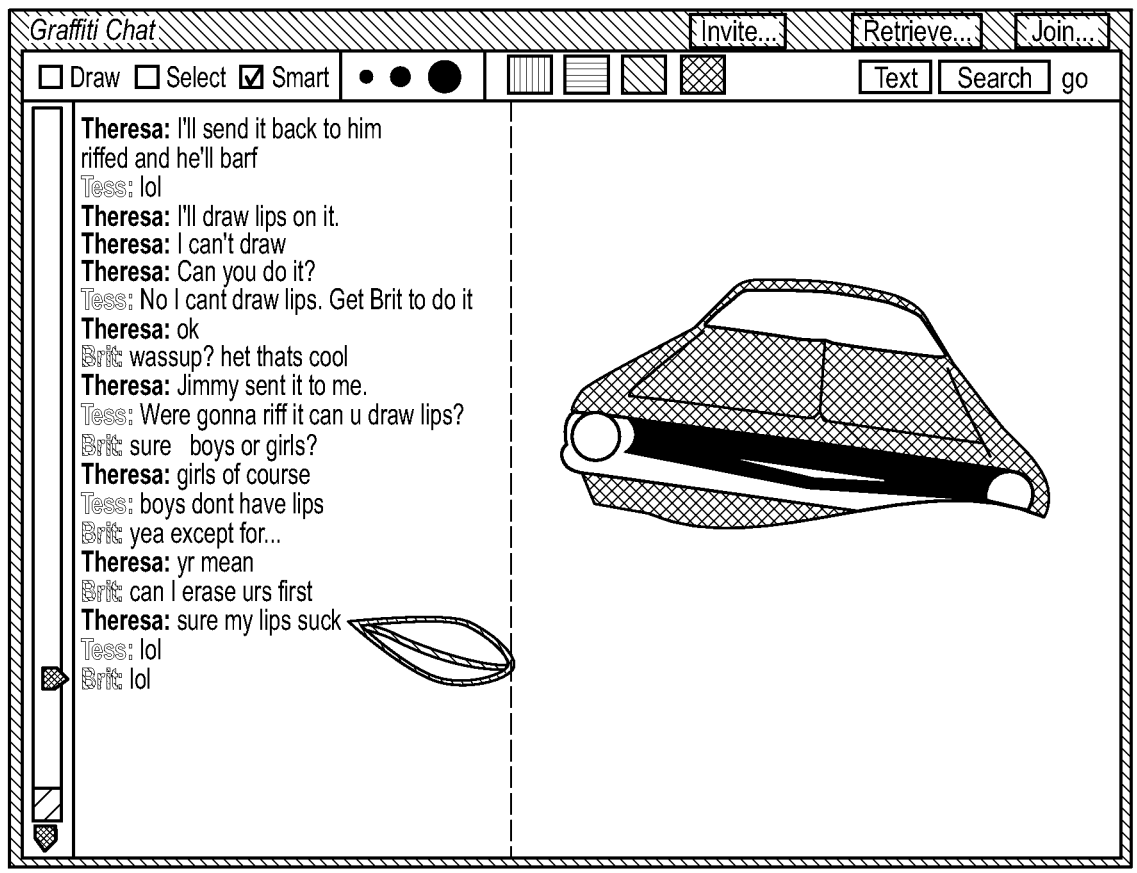

FIG. 9D: Brit is invited to the conversation and asked to draw better looking lips than Theresa has done. Brit selects Theresa's digital ink lips and drags them beside Theresa's chat entry, "sure my lips suck". Because the graphic object encroaches the text chat column (912), it will now scroll with the text, remaining attached to this text entry. (At some later time the graphics could be selected and deleted or moved back to the graphics canvas.)

Figure 9E:
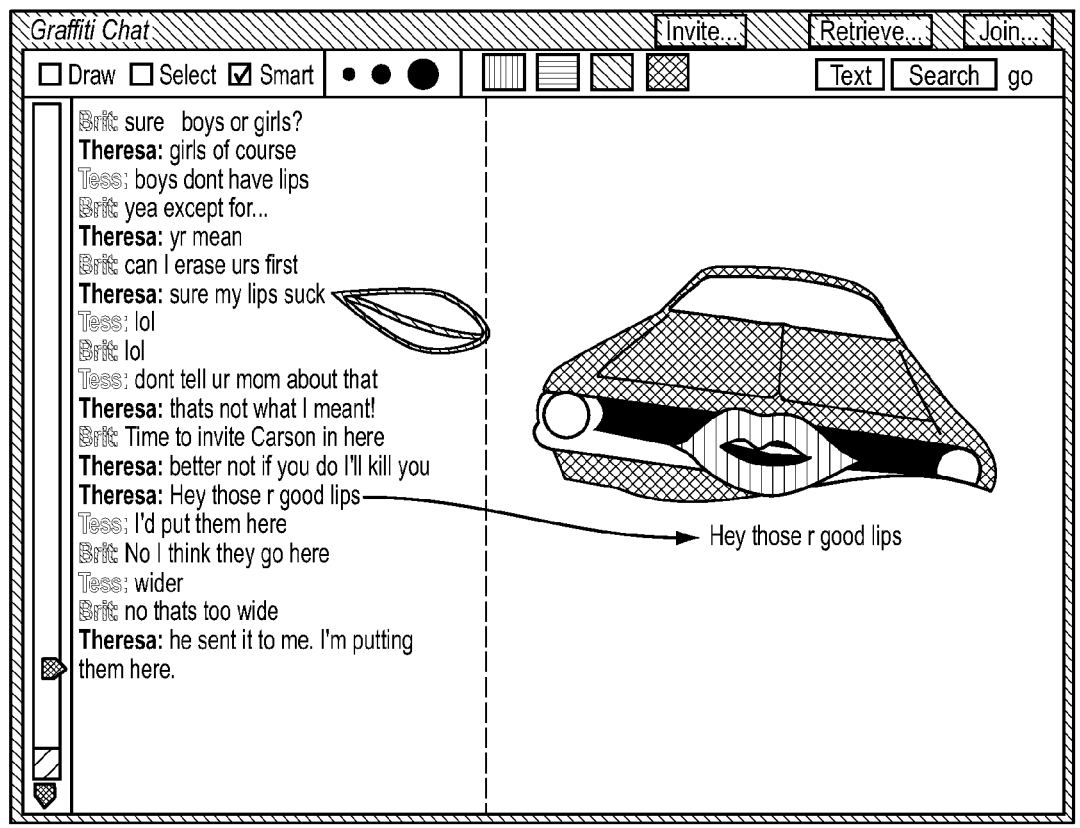

FIG. 9E: This figure shows that Theresa's lips drawing has scrolled with the chat column. Furthermore, text in the chat column can be selected by mouse drag point-and-click, or other common user interface techniques. Once selected, this text cannot be modified, but it can be duplicated by dragging the selected material to the graphics section of the canvas. Here, someone, maybe Brit, maybe Tess, has dragged a copy of Theresa's comment, "hey those r good lips" to the graphics region (906) canvas where it will remain stationary.

Figure 9F:
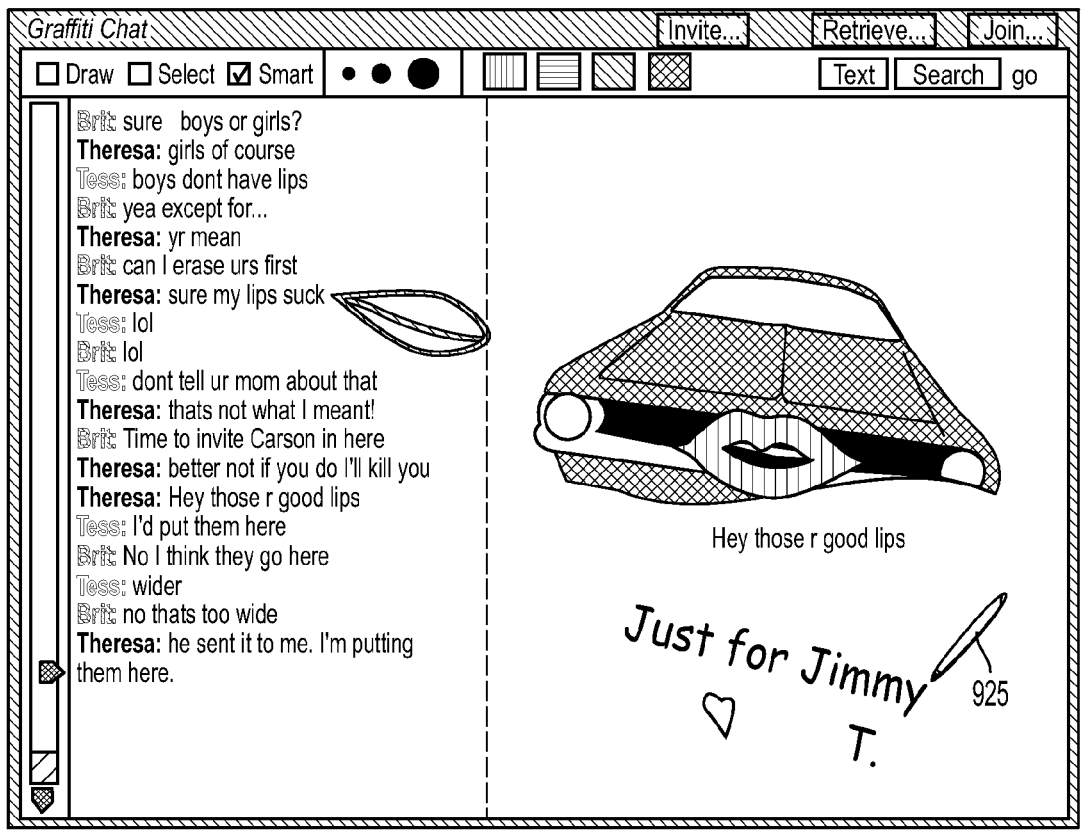

FIG. 9F: Theresa has written some more graffiti on the canvas drawn by stylus 925 controlled by one of the users.

Figure 9G:
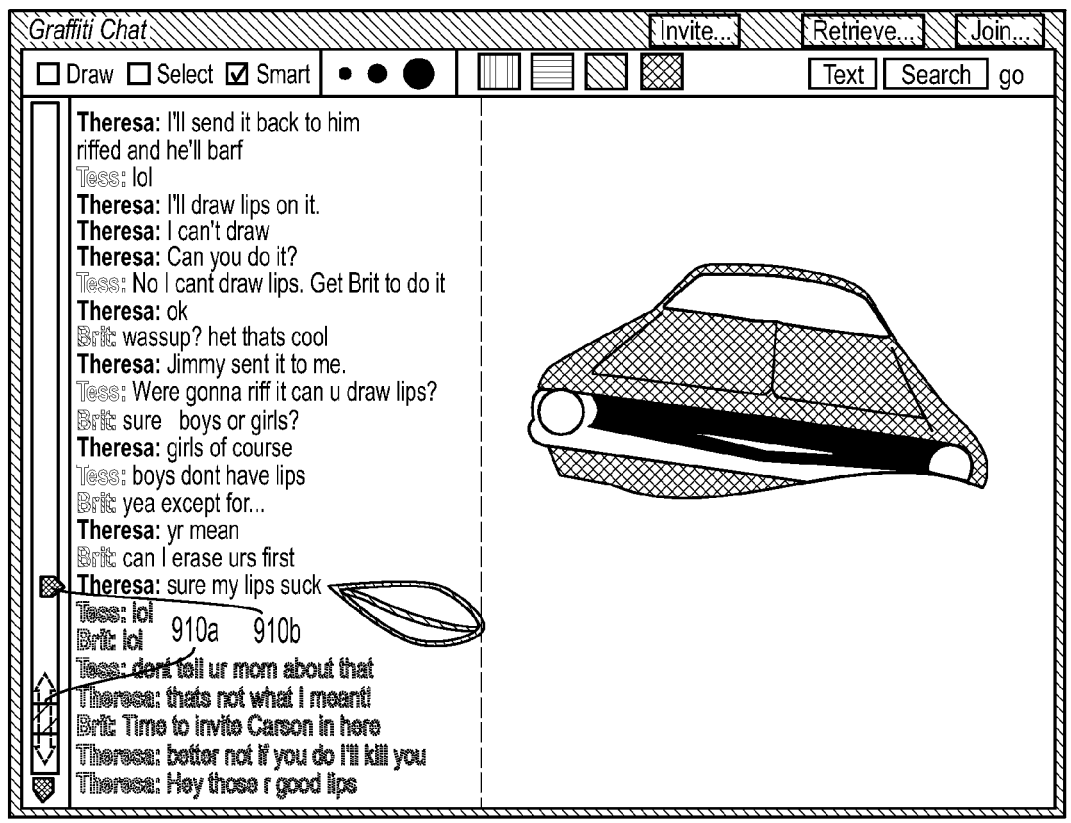

FIG. 9G: Here, one of the participants scrolls their display back in time (via timeline control handle 910a). Note that the currently displayed state of the graphics corresponds to the chat time indicated by the Now locator (910b). In other words, the graffiti added by Theresa in FIG. 9F and the lips and text added to the graphics region in FIG. 9E have been undone and are removed from visible display on the canvas. Of course, as the timeline is again moved forward, these objects will be re-displayed on the canvas.

One design option is for all participants to independently control their own time histories. Another design option is for time travel to become synchronized, so multiple participants see their displays all scrolled backward at once under the control of one participant. In a further embodiment of the present systems and processes, user interface controls are provided for locking and/or unlocking time travel in synchrony with others.

Figure 9H:
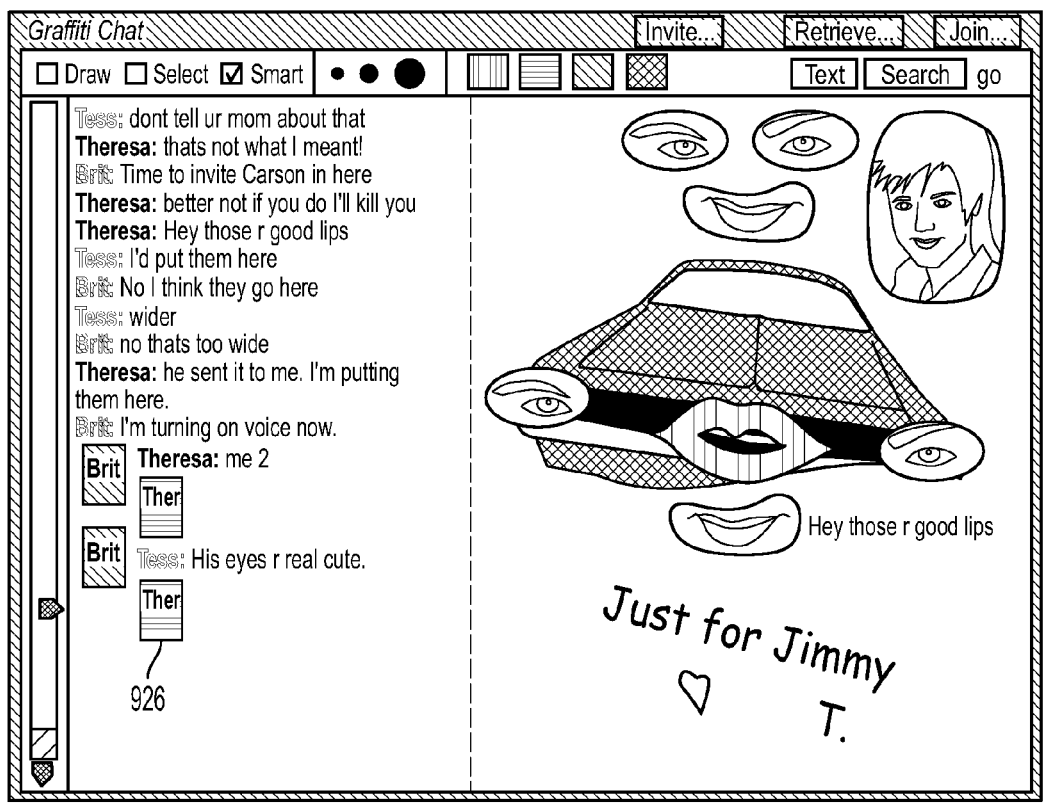

FIG. 9H: Chat and graphical items are not limited to text. In a voice/multimedia version of this system and process, chat items can be audio/video clips (926). Currently existing speech analysis techniques can detect the start and stop times of utterances, and associate icons with these that are situated along the timeline according to their start time and duration.

These icons should be visually tagged by speaker, for example using the same color as indicates that user's text chat entries. As with text, voice and video chat items can be dragged to the canvas where they remain stationary, available for playing.

Because the chat column induces a timeline that indexes entries by time, it will be possible to author dialogs synchronizing linguistic events with graphical events. If chat entries were audio/video clips, then contributors could be authored to speak in turn as graphic operations take place. An alternative version of this system and process permits editing operations for authoring graphic animations in a much more intuitive and easy-to-use interface than the Flash editors or other tools.

Figure 9I:
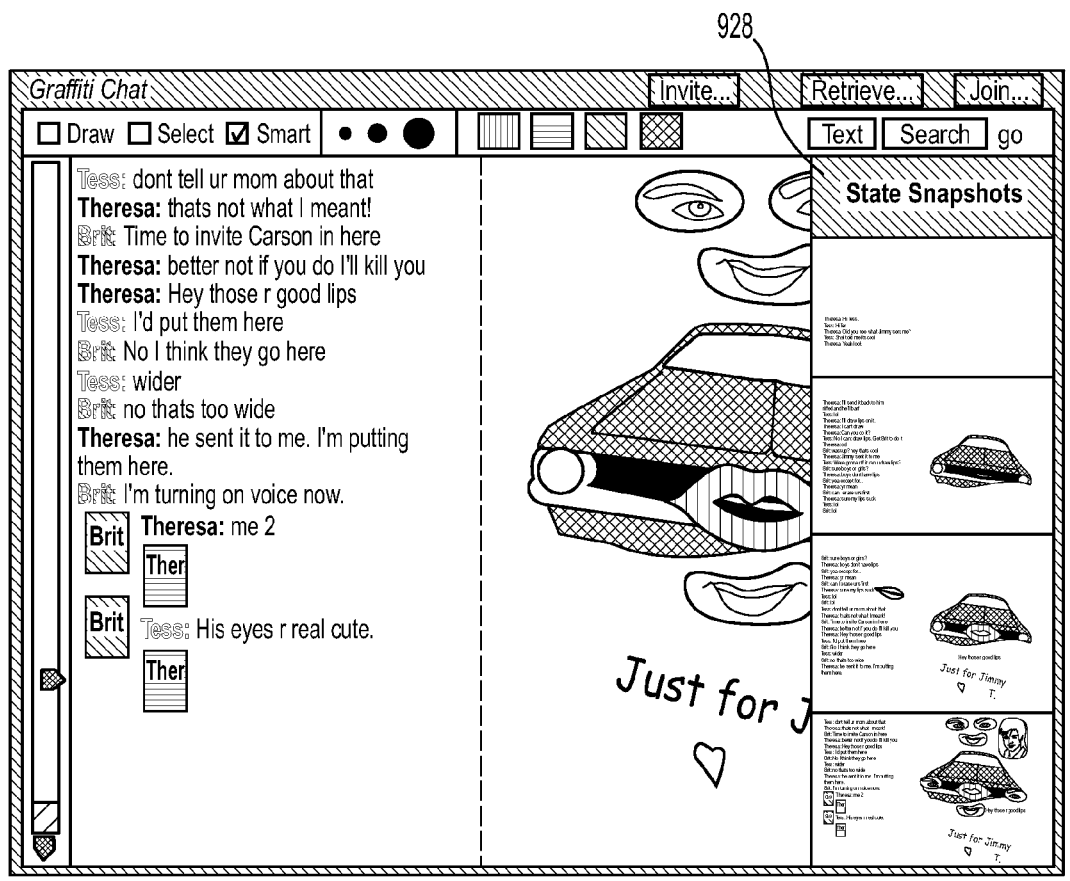

FIG. 9I: A further design option enables users to select past points in the session history by browsing a menu of thumbnails of past states 928.

Figure 11:
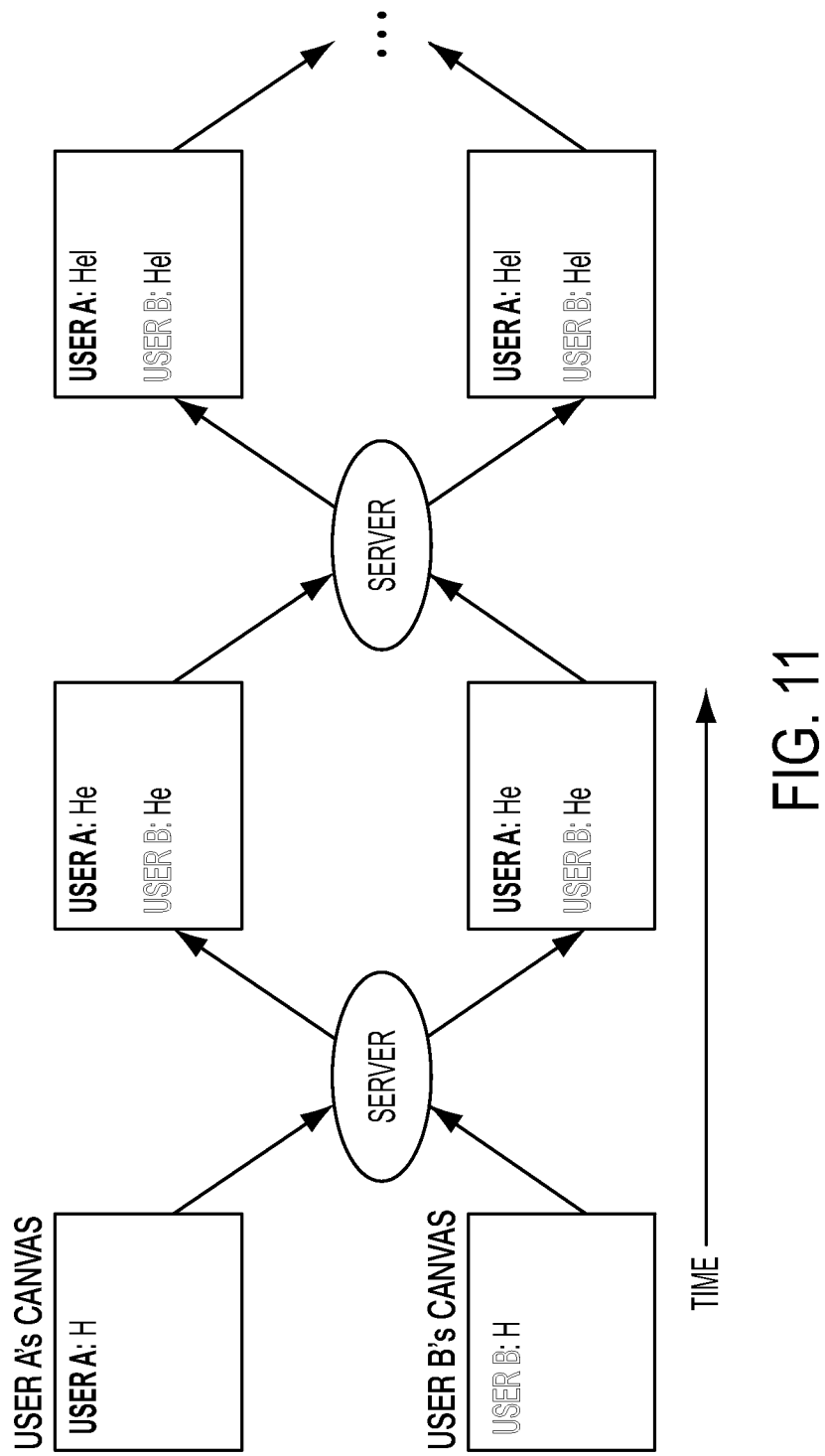
FIG. 11 illustrates the operation of a non-optimistic serialization protocol which may be used in connection with the present application.
Figure 12:
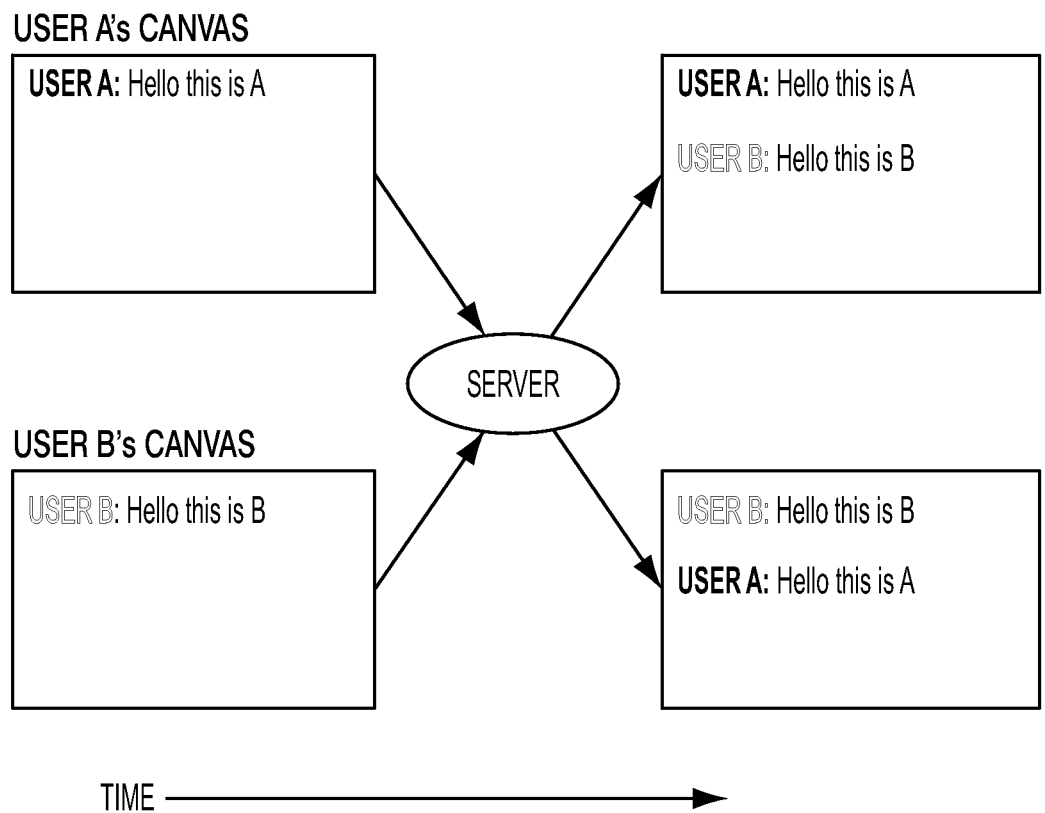
FIG. 12 illustrates operation of an optimistic serialization protocol which may be used in the present application.

Turning now to another issue, it is known that a problem in any remote collaboration application such as chat and shared whiteboards is maintenance of consistency across remote users. Text entry, image creation, and image editing events are transmitted from one user to another as events over a network which may impose time delays. A number of different protocols have been developed, each with its own tradeoffs. Three main approaches are "Semi-optimistic locking" illustrated in FIG. 10, "Nonoptimistic Serialization" illustrated in FIG. 11, and "Optimistic Serialization" illustrated in FIG. 12. Each of FIGS. 10-12 represent a situation where two users are typing some text chat and hit the Return key at approximately the same time.

Figure 10:
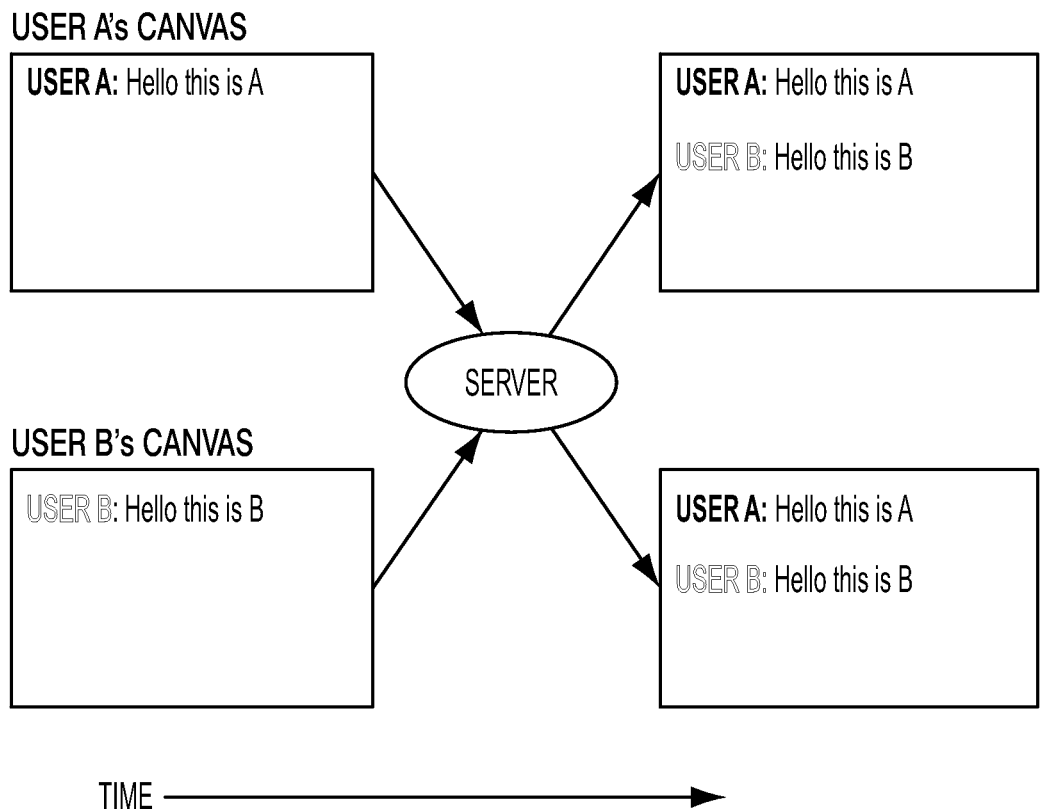
FIG. 10 illustrates operation of a semi-optimistic locking protocol which may be used in the present application.

With attention to FIG. 10, provided is the Semi-Optimistic locking protocol which provides immediate entry, and delayed rectification to produce consistent outcomes. This first approach has each user's keystrokes registered locally immediately, but, when the text line is complete, it is then sent to an arbiter (a server) that resolves inconsistencies among the users. In this case this means deciding which user's entry will appear first and which second. Each client then is responsible for updating the display in accordance with these instructions, resulting in all displays being consistent. This protocol can lead to one user's screen abruptly inserting the other's message into what they perceive to be past time. For example, in FIG. 10, user B types their entry and hits return before there is any evidence that user A is active. Then, after they have hit return, they suddenly see that user A's message appears prior to theirs in the chat.

A worst case scenario for Semi-Optimistic Locking occurs not with text in the chat region, but in operations within the graphics region (e.g., with the shared whiteboard scenario) in which two users may attempt to select the same image object at the same time, and then modify it in different ways. When an object is selected, this information should be registered as a lock with the server and this lock distributed to other clients so that others cannot then select the object. This is the principle mechanism for ensuring consistent state among multiple users. But if two users select an object at the same time, they will each obtain a local lock and thereby permission to modify the object. Only later will the server receive both locks and decide which one is valid. The user who loses this arbitration may have already performed some action on the object. This will have to get un-done when the server informs them that their lock and subsequent actions have been overridden.

This worst case scenario will occur relatively rarely and Semi-Optimistic Locking of FIG. 10 is one way to address this issue. Particularly, if the delays are only a fraction of a second, as can be expected, then users will not have time to do a lot of work that could get retracted by the server. At most they will experience that they got to select something and maybe start to move it but then the server revokes this brief action. This protocol is implemented in terms of events that get sent to the server, arbitrated if necessary, then propagated to other clients. These events will generally represent state changes, and in some cases a client will have to undo actions the local user has taken in order to maintain global consistency.

Turning to FIG. 11, illustrated is operation of a system employing Nonoptimistic Serialization which provides server-mediated entry with delayed but consistent outcomes. This system design has all actions routed through a server before they can be registered at any client, including the source client. Under this protocol, users A and B start typing at the same time, but a server arbitrates and decides that user A's entries will be presented on one line while user B's entries will appear on a line below it. Text is not displayed immediately in response to a keystroke but only after it has been routed to the server. A presently existing drawback to this protocol is that it can cause delays, and even slight delays in a user interface are annoying to users.

FIG. 12 illustrates operation of an Optimistic Serialization, which provides immediate and persistent entry, but may provide inconsistent outcomes. This third system design has each user's text registered immediately at their own chat windows, and the other user's text, that arrives a moment later, appears on the following line. This results in a drawback of possibly producing an inconsistency in what appears on the two users' screens.

Turning now to the issue of historical integrity. In an embodiment of this application, time is defined not in terms of a steady passage of microseconds, but by discrete chat and editing events. When a user travels back in time by moving the timeline scroll handle, they visit past states of the session which are manifest as a certain scroll position of the chat column and a certain set of objects made visible in the graphics region. In one embodiment of this system and process, users are not permitted to modify past chat entries or past graphical states.

Thus historical integrity is interpreted not in terms of real time, but as a time frontier defined in terms of events that occur at different times. For example, if a user draws a square and then enters some text chat, the square has occurred in the past with respect to the latest state of the session. But this should not prohibit anyone from editing the square, because the chat event is a different object.

By this consideration, one embodiment of the present system and process uses the following object editing strategy. The significance here is that this applies both to the current state and to past states of the application as traveled back to by history scrolling. Thus, the following Graffiti Chat Editing Protocol Strategy includes:

1. Every object is time stamped with the most recent creation, modification, and deletion event that affected it. This applies both to chat events and graphical events.
2. Any object can be selected at any point in its temporal history.
3. A selected object can always be copied to a clipboard of the system.
4. A selected object can be modified (moved, rotated, deleted etc.) only if its timestamp for that point in the time history matches its present-time (most recent) timestamp. In other words, an object can be modified only from its most recent edit.
5. No chat object can be modified, but it can be duplicated.
6. Any modification operation, including move, rotate, delete, duplicate, and paste, immediately advances the time history scrollbar to the present time. In other words, no operation is permitted to alter history, but information can be retrieved from the past and operated on in the present.

Again, points 1-6 are used to maintain the historical integrity of the system and process.

Turning attention now to another aspect of the present system and process, it is understood that a complete sequential record of graphical editing events may become cumbersome to manipulate and play backward and forward through time. Therefore, another embodiment of the present application employs a mechanism whereby the graphical state at various times in the session history are recorded as singular collections of graphical objects, but individual events leading to that state are discarded. In this description, these collections can be called graphics state snapshots. Depending upon configuration parameters of the system and process, these snapshots may be recorded at more nearby or more distant intervals.

Figure 13:
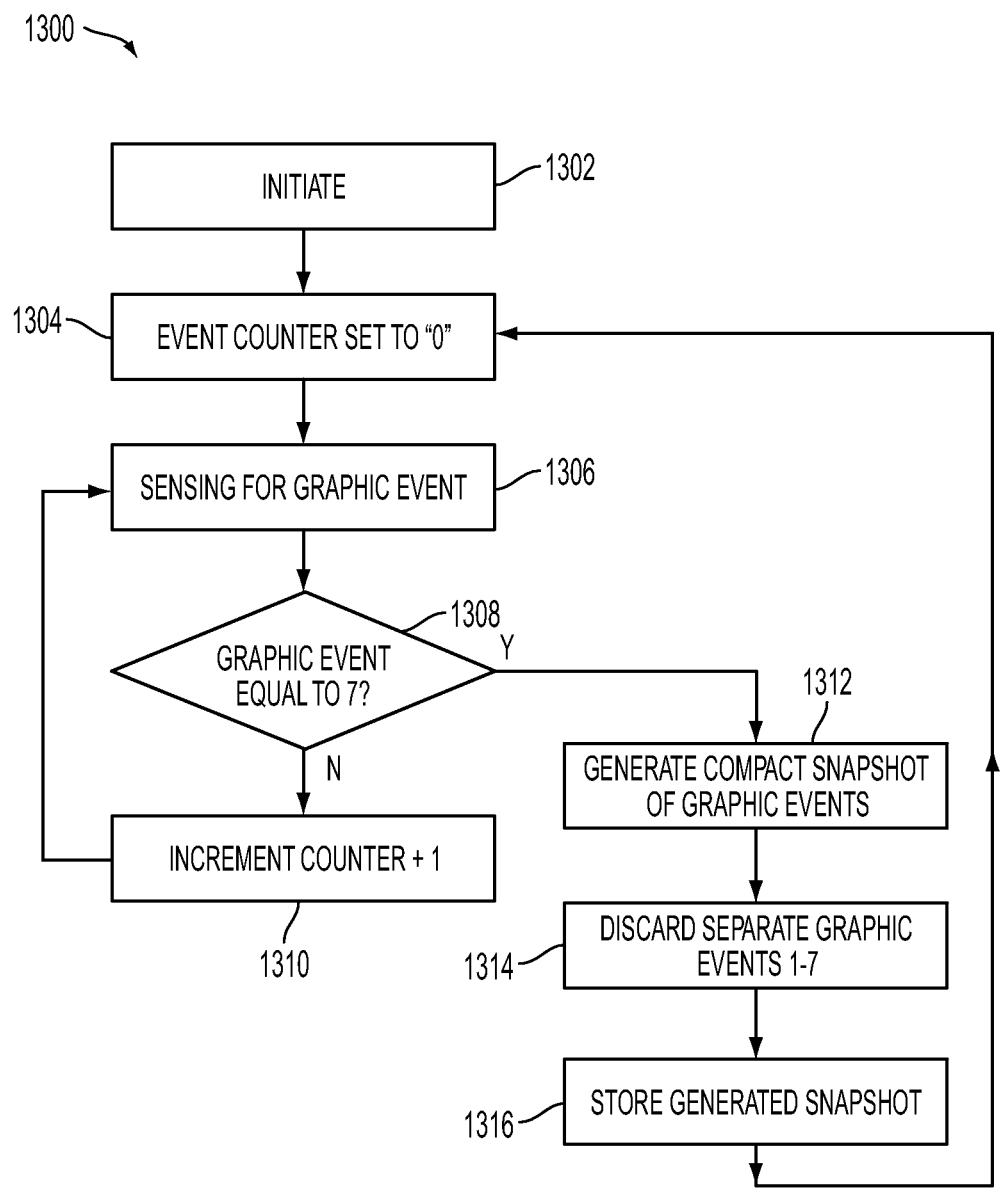
FIG. 13 illustrates a system and process for compacting individual graphic events into a graphic snapshot of those events.

Turning to FIG. 13, depicted is one embodiment of a history roll-up state snapshot system and process 1300. The process is initiated (step 1302) wherein an event counter sets the event count to zero (step 1304), after which the process moves to a waiting state, to sense the occurrence of a graphic event (step 1306). Once a sensed event has occurred, an inquiry is made whether or not the sensed graphics event is equal to seven (it is to be appreciated that, as noted above, more or fewer nearby or more distant intervals may also be selected). If it is determined that there have been fewer than seven graphic events, the process will increment the event counter by one (step 1310), and then move back to the step for sensing of a graphics event (step 1306). On the other hand, if at step 1308 the sensed event was equal to seven, the process generates a compact snapshot, including events 1-7 (step 1312). Then events 1-7 are discarded 1314 (step 1314), and the snapshot is stored in a memory of the system and may be retrieved when a user scrolls the timeline bar as previously discussed (step 1316). At this point, once the snapshot is stored in memory, the process moves back to step 1304, where the event counter is set to zero, and then the process moves to the waiting state for another graphics event.

There is no need for text chat entries to be rolled up in this way because they are represented by a continuous column of text lines whose entry events need not be maintained in themselves.

The effect of rolling up an event history into snapshots is to reduce the temporal resolution of the history to that provided by the snapshot intervals.

Figure 14:
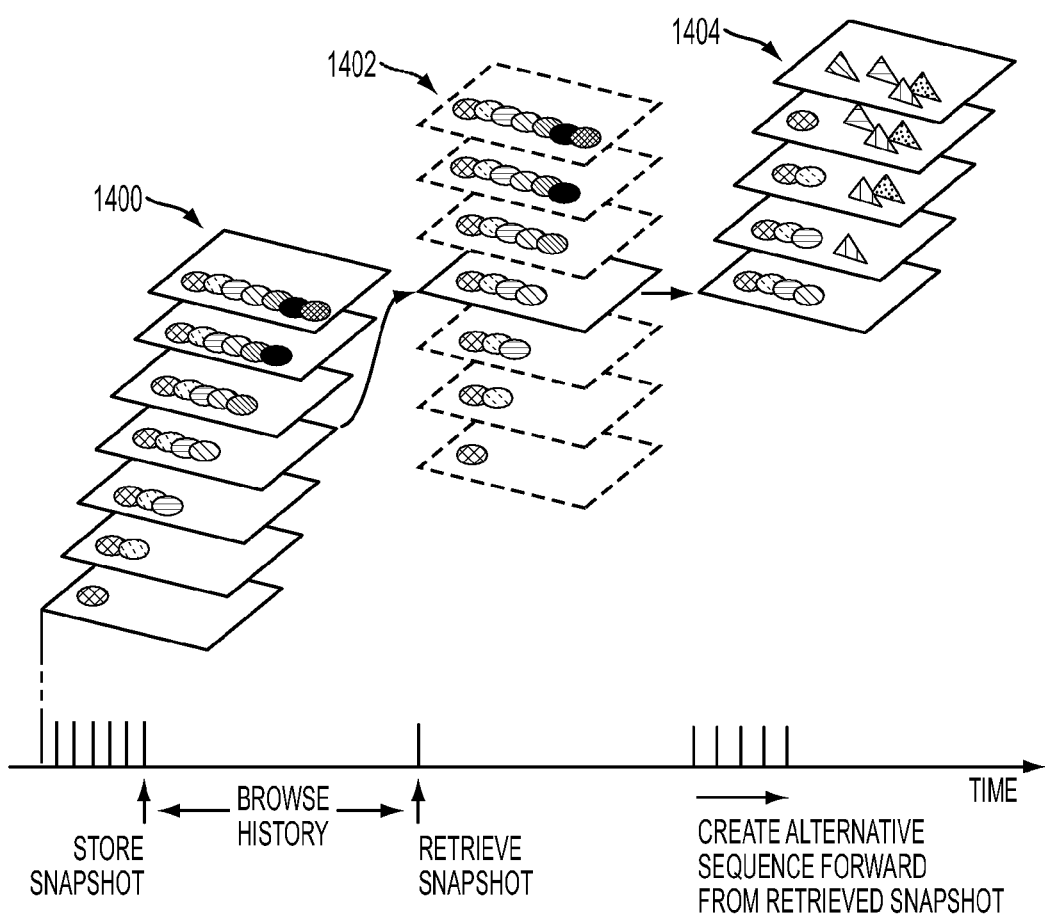
FIG. 14 illustrates a branching capability of the present application for branching during the scrolling of session histories.

Another embodiment of the present system and process includes the capability to store, retrieve and branch on a snapshot of a session at any point in its history. This is done by scrolling to the desired time point, then saving a file which records the chat and graphical state. Later, another session may be initiated with this state as the starting point, effectively permitting a branching of history. More particularly, as shown in FIG. 14, Sessions can be stored at past points in their time histories, then retrieved and edited to create alternative forward sequences. This is equivalent to branching session histories. Here, a sequence of seven edits are made adding circles to the canvas 1400. Next, the user scrolls back in the time history and initiates a new branch of the session, beginning from a snapshot of the historical state at which there were four circles 1402. Finally, the user carries forward from this four-circle state. On this branch, the user adds colored triangles instead of circles 1404.

For revenue generation in a commercial deployment of Graffiti Chat, we propose that users be offered pre-authored content.

In certain embodiments of the present system, users would pay directly for professionally-authored graphics, and perhaps also for copies of chat sessions by notable persons such as celebrities. The graphics may be offered on a limited-edition basis such as the visual "gifts" users pay for currently on Facebook. In Graffiti Chat, these for-pay graphics might be complex, targeted to the users' interests and demographic, and offered on a limited basis (only 10,000 users get to purchase it). Added value is provided by the fact that in the Graffiti Chat editing environment, the graphics are not limited to simple flat images, but can be structured objects that can be customized in meaningful ways by the purchasing user.

Under a second model, advertisers and commercial partners pay an owner of Graffiti Chat to make their graphical content available to users. For example, a shoe company pays the Graffiti Chat hosting service a fee for Graffiti Chat to make available branded images of the company's shoes for users to include in their chat/shared whiteboard sessions.

In another scenario, the concepts of Graffiti Chat gives users the ability to type their chat text in a custom font, such as their own handwriting. Commercial programs already exist allowing users to generate custom fonts for use in office document authoring tools. The embodiment incorporated in Graffiti Chat is to bring this capability to a chat tool. Custom, personalized, fonts are an additional means for text from different users to become readily visually identifiable in the chat column.

Figure 15:
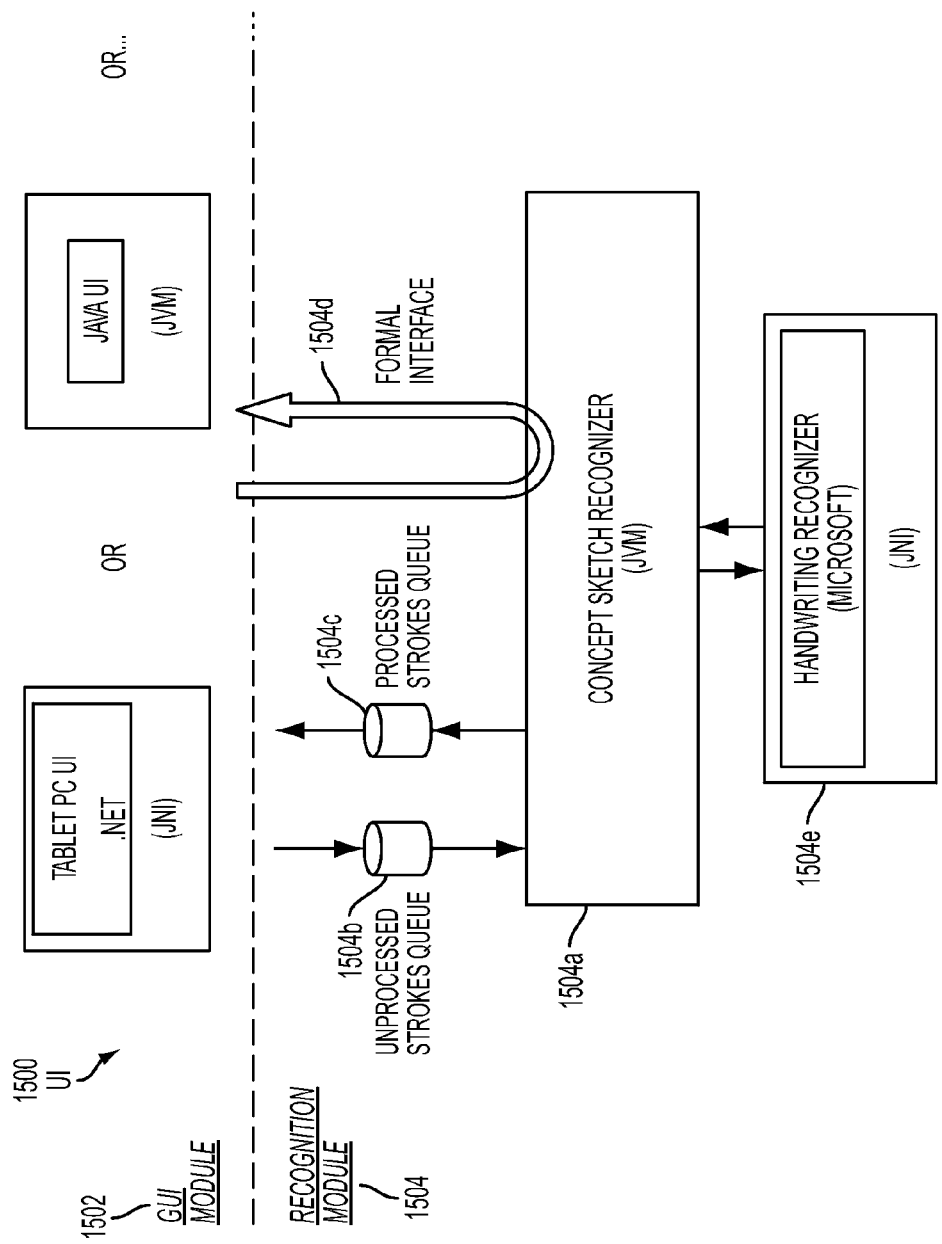
FIG. 15 illustrates a system architecture for a graphics system which may be used in the present application.

Previously discussed has been the idea of employing an inferred mode protocol for the generation of certain graphics in the present systems and processes. The following paragraphs expand on these concepts. Particularly, FIG. 15 illustrates a system architecture overview of a User Interface (UI) 1500, showing a relationship between a GUI module 1502, and Recognition module 1504. GUI module 1502 is designed to handle input and display of digital ink strokes on the canvas, and the majority of the command interaction logic such as detecting encircling strokes and presenting and handling pop-up buttons. GUI module 1502 may be implemented in a variety of programming language and run-time environments, which may be different from the environments of Recognition module 1054, which includes a sketch/diagram/drawing recognizer such as a ConceptSketch recognizer (which may run in a, JVM—Java Virtual Machine) 1504*a*, unprocessed strokes queue 1504*b*, a processed (interpretation) strokes queue 1504*c*, a formal interface 1504*d* and access to a handwriting recognizer 1504*e*.

As will be discussed in greater detail below, Recognition module 1504 is designed to interpret the user's input markings in terms of words, lines, columns of text, graphic objects and the model of node-link diagrams. The unprocessed strokes queue 1504*b* is designed to receive electronic ink stroke information from GUI module 1502, and processed strokes queue 1504*c* will provide processed stroke information from Recognition module 1504 to GUI module 1502. Formal interface 1504*d* provides a path for interaction between the two modules. The handwriting recognizer, in one embodiment may be handwriting software from Microsoft Corporation, such as may be used in its TabletPC operating systems.

Figure 16:
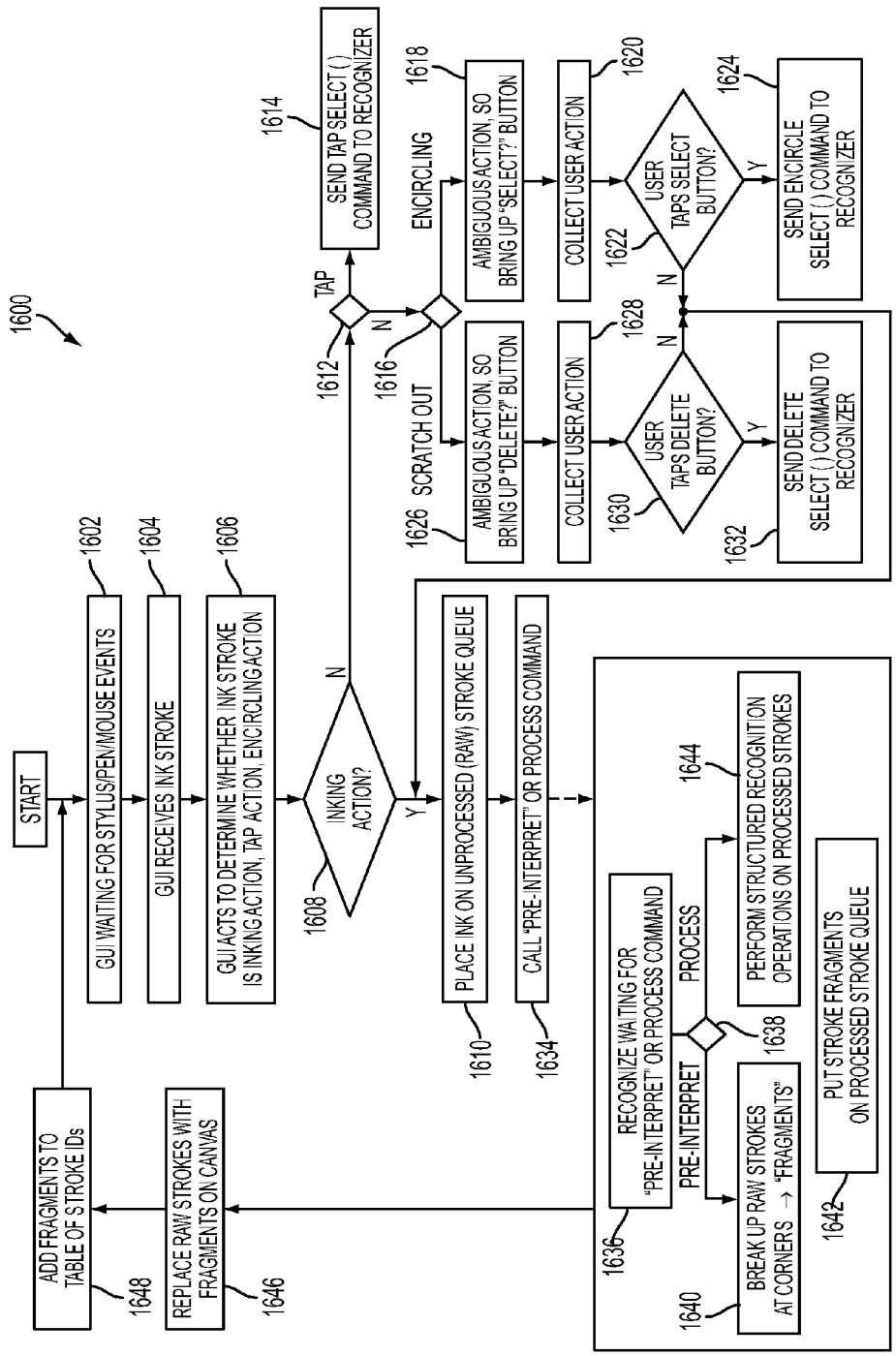
FIG. 16 illustrates a flow chart for implementing graphic editing operations.

Turning now to FIG. 16, set forth is a high-level flow chart 1600 illustrating implementation of the present concepts. At step 1602, the GUI module is waiting for an event, such as an input (e.g., a stroke) from the stylus or pen. When the user puts the pen to the surface of the canvas, the GUI module receives an ink stroke 1604. Upon receipt of the ink stroke, the GUI module determines whether the ink stroke is: (i) an inking action, (iii) a tap action, (iii) an encircling action, or (iv) a scratch-out action 1606. The inking action is interpreted as an act of writing or drawing on the canvas. A tap action is the movement of the stylus or pen onto a spot of the canvas and is intended to select or deselect the item which is tapped. Alternatively, when an item is selected, a tap in the background of the canvas acts to deselect that item. The encircling action is an ink stroke that encircles other existing ink strokes or other items and may be an inking action or selection gesture. The scratch-out action is an act of writing or drawing in a zig-zag, back-and-forth, X-ing out, or other "delete" type action over existing ink strokes or other items. As part of the process, the encircling and scratch-out actions will be determined to be either inking actions or selection gestures.

In step 1608, an initial decision is made as to whether the stroke is definitely an inking action (i.e., intended to be writing or drawing). Step 1608 determines that a stroke is definitely an inking action if one of the following is true: (i) the stroke's length is less than a predetermined size and there are no objects on the canvas nearer than a predetermined distance to the stroke and the stroke begins within a predetermined time after the end (pen-lift) of the previous stroke; (ii) the stroke does not form a closed path shape and does not form a zig-zag (scratchout) shape; (iii) the stroke forms a closed path shape that does not encircle any other material on the canvas; or (iv) the stroke forms a zig-zag (scratchout) shape but no objects on the canvas are within a predetermined proximity to the stroke.

If the process determines the stroke is definitely an inking action, the processing proceeds to step 1610 where the stroke is placed on the unprocessed raw stroke queue (e.g., 1054b of FIG. 15). If the stroke is ambiguously an inking action or a tap select, encircling select, or scratch-out command gesture, the process moves to step 1612 to determine whether the stroke is a tap action, or else one of an encircling action, scratch-out action, or inking action. Step 1612 determines the stroke is a tap action if the stroke's length is less than a predetermined threshold, the stroke begins more than a predetermined time after the end (pen-lifting) of the previous stroke, and if at least one object on the canvas is within a predetermined distance of the stroke's location. If in step 1612, the action is determined to be a tap action, the process moves to step 1614, which sends a command or signal to the Recognizer module to perform the operation associated with the corresponding tap select command (not shown in this figure). On the other hand, at step 1612, if it is determined the action is not a tap action, processing proceeds to step 1616. Step 1616 determines whether the stroke is possibly an encircling select gesture or possibly a scratch-out delete gesture, based on the stroke's shape.

If the stroke is possibly an encircling select gesture, then a "Select?" button is displayed to the user 1618. This indicates the encircling action is ambiguous to the system as it cannot determine if the encircling action is intended to be an inking action (i.e., a writing or drawing), or a selection gesture. Therefore, in step 1620, the system is positioned to collect user actions which will clarify the situation. More particularly, in step 1622, if the user places the stylus or pen to the "Select?" button associated with the encircled information, the system moves to step 1624, where an encircle select command is provided to the Recognition module (not shown in this figure). This indicates that the encircling action is a selection gesture. Then the Recognition module will determine what is selected. The Recognition module, for example, could select what was encircled or covered by a scratch-out, or it could interpret the intent of the gestures in terms of recognized strokes (or other items) that were or were not literally covered. On the other hand, if at step 1624, the user does not perform a tap select operation, but rather places the pen down in the background of the canvas, the system interprets this as indicating the encircling information is intended to be a word or drawing, and the stroke is added to the canvas as digital ink at step 1610.

If the stroke is possibly a scratchout delete gesture 1616, then at a "Delete?" button is displayed for the user 1626. This indicates the stroke action is ambiguous to the system as it cannot determine if the stroke action is intended to be an inking action (i.e., a writing or drawing), or a deletion gesture. Therefore, in step, 1628, the system is positioned to collect user actions which will clarify the situation. More particularly, in step 1630, if the user places the stylus or pen to the "Delete?" button associated with the objects in close proximity to the stroke, the system moves to step 1632, where a scratchout select command is provided to the Recognition module (not shown in this figure). This indicates the inking action is a deletion gesture and the items covered by the gesture are deleted from the Recognition module and the UI canvas. On the other hand, if at step 1630, the user does not perform a tap select operation on the "Delete?" button, but rather places the pen down in the background of the canvas, the system interprets this as indicating the scratchout stroke is intended to be a word or drawing, and the stroke is added to the canvas as digital ink at step 1610.

When an action is determined to be an ink stroke at step 1610, the process places the stroke—identified as inking actions—on the unprocessed (raw) strokes queue. In step 1634 a pre-interpret or process command is sent to the recognizer module to perform "pre-interpret" and/or "process" operations on the strokes in the unprocessed strokes queue. The operations performed in steps 1602 through 1634, maybe considered to take place in the GUI module (e.g., 1502 of FIG. 15). At this point, the Recognition module will undertake the pre-interpret and/or process commands. However, as the GUI module and Recognition module are temporally de-synchronized in their operations, additional strokes may be placed on the canvas, during this time, and the GUI module will continue to operate independently.

With regard to the Recognition module, as shown in step 1636, the Recognition module is waiting for the "pre-interpret" or "process" commands to be issued by the GUI module. Once received, operation of the Recognition module moves to a decision block 1638, wherein the process moves to step 1640 when it is determined the command is a pre-interpret command. At that point, the raw strokes from the unprocessed strokes queue are broken up at the corners into fragments (This operation is for more complex strokes. For simple strokes, which have no corners, this operation is not necessary).

Thereafter, the stroke fragments and/or simple strokes are provided with identification information (IDs) and are then placed on the processed strokes queue 1642. Once this information has been placed on the processed strokes queue, the GUI layer 1502 moves to step 1646 and replaces the raw strokes with the stroke fragments from the processed strokes queue. Then in step 1648, the GUI adds all the stroke fragments to a table or other memory device along with the stroke IDs. Hence, once put in the table or other memory device, the stroke fragments replace the raw strokes on the canvas (such replacement will be imperceptible to a user).

It is to be understood that in an initial passing of the stoke information between the GUI module 1502 and Recognition module 1504, both the information of the points (i.e., x-y positions and time) making up the stroke fragments, along with the IDs, are passed to the GUI module. In this way, the Recognizer module and the GUI module has the same stored information regarding the strokes.

If the command sent from the GUI module is a "process" command, rather than a "pre-interpret" command, then at step 1636, the process moves to step 1644 where structured recognition operations are performed on the processed fragmented strokes. Thereafter, these structured processed fragments may, in one embodiment, be maintained in the Recognition module until strokes (e.g., in the form of objects) are selected for some sort of command operation (e.g., formalize, move, etc.).

Flowchart 1600 outlines the process of determining whether a stroke is an inking action, a tap action, an encircling action or a scratch-out action, and the operations taken following such a determination. Employing the above process permits a user to create node-link diagrams as intuitively as using a paper or whiteboard, but with the power and functionality of computer applications.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for communicating in an online electronic chat environment having multiple communication devices connected to each other in a communication network, the method comprising:
    displaying on a display screen of an electronic communication device of the multiple communication devices, a chat region, a graphics region, and a boundary indicator, the chat region and the graphics region positioned on a common electronic canvas of the display screen, visually identified as separate regions by the boundary indicator;
    inputting text into the chat region;
    providing time stamps to the text in the chat region;
    moving at least a portion of the inputted text from the chat region to the graphics region across the boundary indicator;
    inputting graphic objects into the graphics region;
    providing time stamps to the graphic objects in the graphics region;
    synchronizing the time stamps of the graphic objects and the time stamps of the text;
    moving at least a portion of the inputted graphic objects from the graphics region to the chat region across the boundary indicator; and
    operating a time control to visit past states of a communication session shown on the display screen, wherein graphic objects are deleted, added, and/or modified in the canvas in synchrony with the corresponding state of the text in the chat region at the corresponding time, as text and graphics had been input and modified during the communication session.

2. The method according to claim 1 wherein the step of moving includes dragging graphic objects from the graphics region to the chat region includes attaching the moved graphic objects to a list of text in the chat region, and scrolling the moved graphic objects with the list of text.

3. The method according to claim 1 wherein the step of moving includes dragging the text from the chat region to the graphics region includes identifying the moved text as a non-scrolling text, which can be edited.

4. The method according to claim 1, wherein the operating the time control further includes:
    moving a timeline control handle of a scroll bar forward and/or backward to scroll text entered in the chat region by users, the forward and/or backward movement of the timeline control handle causing forward and/or backward scrolling of the text, wherein the synchronized graphic objects are deleted, added and/or modified in the canvas in the graphics region dependent on movement of the text which is synchronized to the graphic objects.

5. The method according to claim 1, wherein the operating the time control further includes:
    entering a search term in a search region on a display holding the electronic canvas;
    searching the text in the chat region based on the search term entered in the search region;
    moving the text in the chat region to a location in response to the entered search term; and
    altering the graphic objects displayed on the canvas in a synchronized manner to the moving of the text in the chat region.

6. The method according to claim 1 further comprising displaying chat text messages in a customized format.

7. The method according to claim 6 wherein the customized format is in the form of the users own handwriting.

8. The method according to claim 1 wherein at least some of the graphic objects in the graphics region are pre-authored content.

9. The method according to claim 1 wherein at least some of the text in the chat region is pre-authored content.

10. The method according to claim 1 further comprising:
    editing the graphic objects in the graphics region using a graphic editing application having an Inferred Mode protocol for selecting and drawing digital ink without a need for a prior specification of mode.

11. The method according to claim 1 further comprising:
    editing the graphic objects in the graphics region using an editing system which maintains structured representations of groups through selection and the editing operations.

12. The method according to claim 1 further comprising:
    performing a plurality of actions in the graphics region which are defined as graphic events;
    generating a snapshot of the plurality of graphic events, the snapshot comprising the plurality of graphic events compressed into a single graphic event; and
    storing the snapshot in a memory.

13. The method according to claim 1, wherein the operating the time control further includes:
    moving a timeline control handle in a scroll bar to scroll text in the chat region; and
    re-doing and undoing graphic events in the graphics region in a manner synchronized to the moving of the text corresponding to the moving of the timeline control handle.

14. The method according to claim 13 further comprising:
    moving the timeline control handle backward to a past point in a session history;
    retrieving a particular graphic object at the past point in the session history; and
    editing the particular graphic object different from how it was edited previously, creating an alternative forward sequence.

15. A system for communicating in an online electronic chat environment comprising:

a plurality of electronic communication devices each having a display screen configured with a chat region to hold inputted text, wherein the inputted text in the chat region are time stamped, a graphics region to hold inputted graphic objects, wherein the inputted graphic objects in the graphics region are time stamped, the time stamps of the graphic objects and the time stamps of the text being synchronized, and a boundary indicator which visually identifies the chat region and the graphics region as separate regions on a common electronic canvas, and further configured to allow at least a portion of the text of the chat region to move to the graphics region across the boundary indicator and to allow at least a portion of the graphic objects of the graphics region to move to the chat region across the boundary indicator, and a time control mechanism operated to visit past states of a communication session shown on the display screen of the communication devices, wherein graphic objects are deleted, added, and/or modified in the canvas in synchrony with the corresponding state of the text in the chat region at the corresponding time, as text and graphic objects had been input and modified during the communication session; and a server in operational communication with the plurality of electronic communication devices to receive data from the chat region and graphics region of the plurality of electronic communication devices and to forward the received data among the plurality of electronic communication devices.

16. A method for communicating in an online electronic chat environment having multiple communication devices connected to each other in a communication network, the method comprising:
displaying on a display screen of an electronic communication device a chat region, a graphics region, and a boundary indicator, the chat region and the graphics region positioned on a common electronic canvas of the display screen, visually identified as separate regions by the boundary indicator;
generating text in the chat region;
generating graphic objects in the graphics region;
synchronizing the generated text and the generated graphic objects;
moving a timeline control handle in a scroll bar to scroll text in the chat region; and
re-doing and undoing graphic events in the graphics region in a manner synchronized to the moving of the timeline control handle, wherein graphic objects associated with the graphic events appear and are removed from visible display on the canvas.

17. A method for communicating in an online electronic chat environment having multiple communication devices connected to each other in a communication network, the method comprising:
displaying a chat region with text located therein and a graphics region with graphic objects located therein, on a common electronic canvas;
identifying a graphic object in the graphics region;
capturing the identified graphic object;
dragging the selected graphic object to a desired location on the common electronic canvas;
releasing the selected graphic object;
testing the selected graphic object to determine if the selected graphic object is one of a scrolling object or a non-scrolling object;
identifying the selected graphic object as one of a scrolling object or a non-scrolling object based on the testing of the selected object; and
inserting the selected object into a chat scrolling list when identified as a scrolling object.

18. The method of claim 17 further comprising moving a timeline control handle of a scroll bar forward and/or backward to scroll text in the chat region forward and/or backward in response to movement of the timeline control handle, wherein the inserted selected object scrolls with the scrolling text.

19. The method according to claim 17 further comprising:
identifying text in the chat region;
capturing the identified text;
dragging the selected text to a desired location on the common electronic canvas;
releasing the selected text at a location on the canvas;
testing the selected text to determine if the selected text is one of scrolling text or non-scrolling text;
identifying the selected text as one of a scrolling text or a non-scrolling text based on the test of the selected text; and
placing the selected text at the location as a text object capable of being edited when the selected text is identified as a non-scrolling text object.

20. A method for communicating in an online electronic chat environment having multiple communication devices connected to each other in a non-transitory communication network, the communication devices configured to have a computer-readable program code embodied therein, the computer-readable program code adapted to be executed to implement a method for generating a chat region and a text region on a single display screen, the method comprising:
displaying on the display screen the chat region;
displaying on the display screen the graphics region;
inputting text into the chat region;
inputting graphic objects into the graphics region;
providing a boundary indicator which visually identifies the chat region and graphics region as separate regions;
moving at least some of the text from the chat region to the graphics region across the boundary indicator;
moving at least some of the graphic objects from the graphics region to the chat region across the boundary indicator;
providing a time stamp to the graphic objects in the graphics region;
providing a time stamp to the text located in the chat region;
synchronizing the time stamps of the graphic objects and the time stamps of the text; and
moving a timeline control handle of a scroll bar forward and/or backward to scroll text entered in the chat region by users, the forward and/or backward movement of the timeline control handle causing forward and/or backward scrolling of the text, wherein the synchronized graphic objects are deleted, added and/or modified on the display screen in the graphics region dependent on movement of the text which is synchronized to the graphic objects.

21. A method for communicating in an online electronic chat environment having a plurality of communication devices connected to each other in a communication network, the method comprising:
displaying on a display screen of each of the plurality of communication devices, (i) a chat region which displays at least one of time stamped inputted text and time stamped graphic objects in a sequential order communicated between the communication devices, (ii) a graphics region which displays at least one of time stamped inputted text and time stamped graphic objects as a display synchronized with the communication devices, wherein the time stamps of the graphic objects and the time stamps of the text are synchronized, and the chat region and the graphics region are positioned on a common electronic canvas of the display screen of each of the communication device, and (iii) a boundary indicator which visually identifies the chat region and graphics region as separate regions of the common electronic canvas of the display screen of each of the communication devices;

moving at least a portion of the text from the chat region to the graphics region across the boundary indicator on the display screen of the at least one of the communication devices;

moving at least a portion of the graphic objects from the graphics region across the boundary indicator to the chat region on the display screen of the at least one communication device;

communicating to the other communication devices text and/or graphics input or moved to the chat region of the at least one communication device which are displayed on the other communication device's chat regions, and text and/or graphics changes to the graphics region of the at least one communication device which are displayed on the other communication device's graphic regions; and operating a time control to visit past states of a communication session shown on the display screen of the at least one communication device, wherein the graphic objects are deleted, added, and/or modified in the canvas in synchrony with the corresponding state of the text in the chat region at the corresponding time, as text and graphics had been input and modified during the communication session.

* * * * *